US010796535B2

(12) United States Patent
Elias et al.

(10) Patent No.: US 10,796,535 B2
(45) Date of Patent: Oct. 6, 2020

(54) SYSTEMS AND METHODS FOR FACILITATING A GAME INCORPORATING BLOCKS OF SYMBOLS

(71) Applicant: Roxor Gaming Limited, London (GB)

(72) Inventors: Hans Elias, Hertfordshire (GB); Thomas David James Aicken, London (GB); Alexander Sandford Todd Young, London (GB)

(73) Assignee: Roxor Gaming, Ltd., London (GB)

( * ) Notice: Subject to any disclaimer, the term of this patent is extended or adjusted under 35 U.S.C. 154(b) by 0 days.

(21) Appl. No.: 16/297,570

(22) Filed: Mar. 8, 2019

(65) Prior Publication Data

US 2019/0206196 A1 Jul. 4, 2019

Related U.S. Application Data

(63) Continuation of application No. 14/829,900, filed on Aug. 19, 2015, now Pat. No. 10,275,996.

(60) Provisional application No. 62/039,118, filed on Aug. 19, 2014.

(51) Int. Cl.
*A63F 13/00* (2014.01)
*G07F 17/34* (2006.01)
*G07F 17/32* (2006.01)

(52) U.S. Cl.
CPC .......... *G07F 17/34* (2013.01); *G07F 17/3218* (2013.01)

(58) Field of Classification Search
CPC .... G07F 17/326; G07F 17/34; G07F 17/3265; G07F 17/3213
See application file for complete search history.

(56) References Cited

U.S. PATENT DOCUMENTS

| | | | |
|---|---|---|---|
| 4,826,169 | A | 5/1989 | Bessho |
| 5,704,835 | A | 1/1998 | Dietz, II |
| 6,910,962 | B2 | 6/2005 | Marks et al. |
| 7,144,322 | B2 | 12/2006 | Gomez et al. |
| 7,252,591 | B2 | 8/2007 | Van Asdale |
| 7,553,231 | B2 | 6/2009 | Rodgers et al. |
| 7,749,063 | B2 | 7/2010 | Belger et al. |
| 7,758,414 | B1 | 7/2010 | Marks et al. |

(Continued)

OTHER PUBLICATIONS

Office Action for U.S. Appl. No. 14/829,900 dated Oct. 25, 2017; 8 pps.

(Continued)

*Primary Examiner* — David L Lewis
*Assistant Examiner* — Eric M Thomas
(74) *Attorney, Agent, or Firm* — Fincham Downs LLC; Magdalena M. Fincham

(57) ABSTRACT

In accordance with some embodiments, a game mechanic for an electronic game (e.g., a reel-based slot machine type game) which includes a cascade feature provides for a block of symbol(s) to be moved into and out of a game interface. The block of symbol(s) is moved or manipulated as a single unit and may be stepped into and/or out of the game interface over a course of a plurality of game events (e.g., cascades or spins of the game). The block of symbol(s) may, in some embodiments, comprise at least one symbol which spans a plurality of symbol positions of a symbol matrix when the entirety of it is placed into the symbol matrix. In some embodiments, the block of symbol(s) may function as at least one wild symbol.

10 Claims, 25 Drawing Sheets

(56) References Cited

U.S. PATENT DOCUMENTS

| | | | |
|---|---|---|---|
| 8,152,623 B2 | 4/2012 | Fiden | |
| 8,177,622 B2 | 5/2012 | Englman | |
| 8,192,272 B2 | 6/2012 | Thomas et al. | |
| 8,192,275 B2 | 6/2012 | Aoki et al. | |
| 8,246,447 B2 | 8/2012 | Gauselmann | |
| 8,251,798 B2 | 8/2012 | Belger et al. | |
| 8,366,538 B1 | 2/2013 | Saunders et al. | |
| 8,414,380 B2 | 4/2013 | Saunders et al. | |
| 8,430,737 B2 | 4/2013 | Saunders | |
| 8,454,429 B2 | 6/2013 | Jaffe et al. | |
| 8,512,138 B2 | 8/2013 | Saunders | |
| 8,523,659 B2 | 9/2013 | Evans | |
| 2004/0033827 A1 | 2/2004 | Gilmore et al. | |
| 2008/0108413 A1 | 5/2008 | Gelber et al. | |
| 2010/0022297 A1* | 1/2010 | Saunders ................ | G07F 17/32 463/21 |
| 2010/0062827 A1 | 3/2010 | Hoffman et al. | |
| 2011/0021266 A1 | 1/2011 | Jaffe | |
| 2011/0111830 A1 | 5/2011 | Seeling et al. | |
| 2012/0034973 A1* | 2/2012 | Frank .................. | G07F 17/3244 463/25 |
| 2012/0238348 A1 | 9/2012 | Aoki et al. | |
| 2013/0190067 A1 | 7/2013 | Saunders | |
| 2014/0274282 A1 | 9/2014 | Mastropietro | |
| 2015/0018071 A1* | 1/2015 | Elias ..................... | G07F 17/326 463/20 |

OTHER PUBLICATIONS

Final Office Action for U.S. Appl. No. 14/829,900 dated Aug. 9, 2018; 9 pps.

Notice of Allowance for U.S. Appl. No. 14/829,900 dated Jan. 17, 2019; 7 pps.

* cited by examiner

700C

704

704

700G

700H

700I

SYSTEMS AND METHODS FOR FACILITATING A GAME INCORPORATING BLOCKS OF SYMBOLS

CLAIM OF PRIORITY

The present application is a Continuation Application of U.S. application Ser. No. 14/829,900, filed Aug. 19, 2015 in the name of Elias et al. and titled SYSTEMS AND METHODS FOR FACILITATING A GAME INCORPORATING BLOCKS OF SYMBOLS, which application claims the benefit of priority of U.S. Provisional Application No. 62/039,118 filed Aug. 19, 2014 in the name of Elias et al., titled SYSTEMS AND METHODS FOR FACILITATING A GAME INCORPORATING BLOCKS OF SYMBOLS. The entirety of each of these applications is incorporated by reference herein for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

At least some embodiments described herein relate to electronic games (e.g., such as online wagering games) and particularly to processes and systems for placement and movement of blocks of symbols (e.g., stacked symbols on a given reel) during an electronic game.

DETAILED DESCRIPTION OF EXAMPLE EMBODIMENTS

I. Introduction

Figure 1:
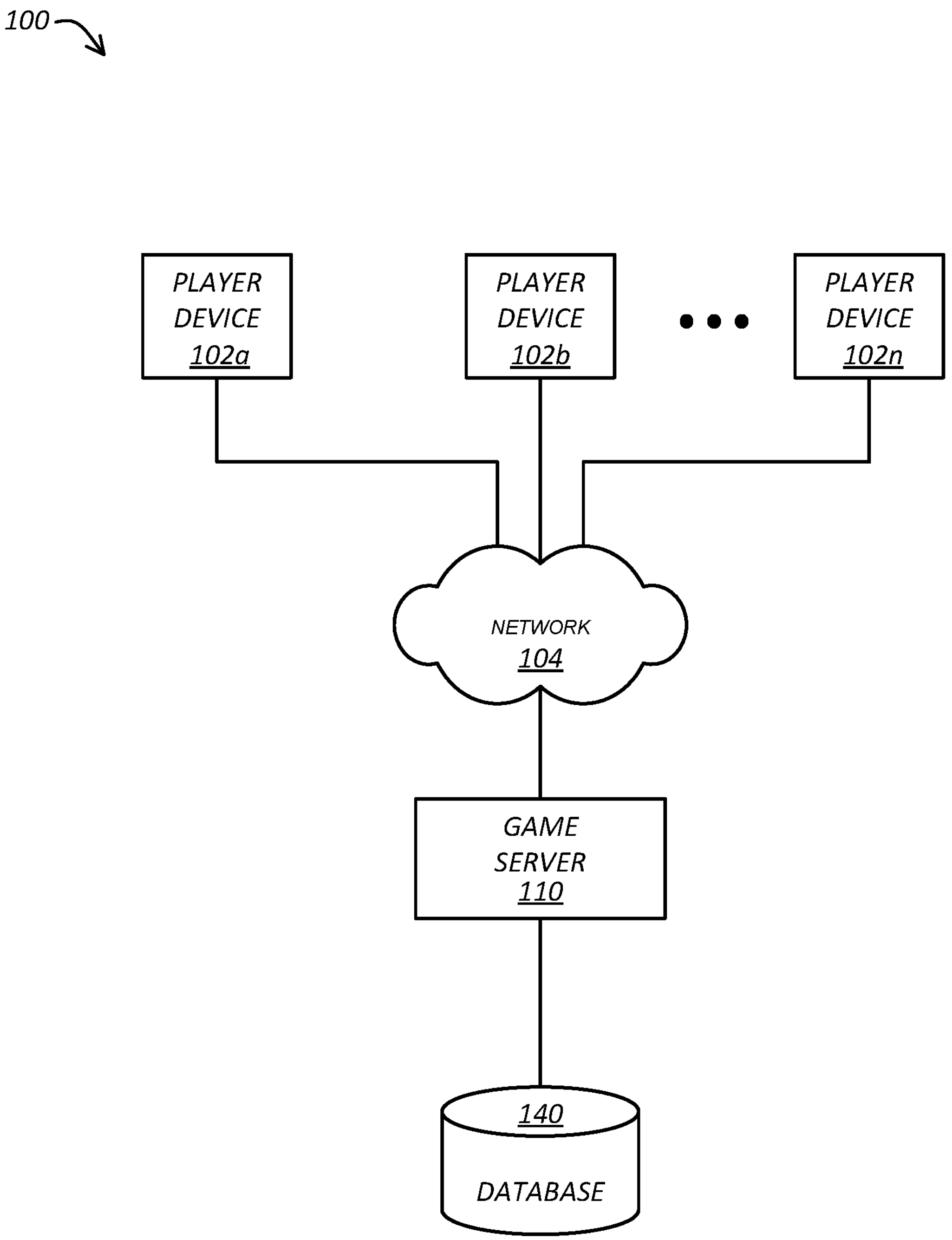
FIG. 1 is a schematic diagram of an embodiment of a gaming system in accordance with one or more embodiments described herein.

In accordance with some embodiments, the game mechanics for placing a block of symbol(s) into a game interface or moving a block of symbol(s) into, out of or within a game interface are described within a context of a game comprising a plurality of symbol positions (e.g., the symbol positions being arranged in a grid configuration, such as in a multi-reel slot machine game, or a card game in which a plurality of hands are dealt in individual rows). The terms "block of symbol(s)" and "block of symbols" are used interchangeably herein and, unless indicated otherwise, refer to a game element comprising at least one symbol that (i) is manipulated or moved as a single unit; and (ii) occupies a plurality of symbol positions within the symbol matrix when an entirety of it is positioned within the symbol matrix.

In one embodiment, a block of symbols may comprise a plurality of symbols in a stacked configuration (i.e., the symbols forming a vertical line, one symbol above the other, for placement on a single reel or column of a game interface). In another embodiment, a block of symbols may comprise a plurality of symbols arranged in a configuration which spans a plurality of reels (e.g., the symbols arranged in a horizontal line, t-shape or other patterns which causes placement of the symbols comprising the block of symbols in symbol positions of more than one reel or vertical column of a game interface).

In accordance with some embodiments, once a block of symbols (or a portion thereof) is placed into one or more symbol positions of a game interface, regular and individual symbols which are to populate the remaining symbol positions (i.e., the symbol positions which have not been populated by the at least one block of symbols, or portion thereof) are determined in accordance with a random process or algorithm. In accordance with some embodiments, a block of symbols moves as one unit into, within or out of a game interface, such that it retains its predetermined configuration or pattern among the symbols comprising the block of symbols during any movement or repositioning of the block of symbols but only a portion of the block of symbols (i.e., a subset of the plurality of symbols comprising the block of symbols) may be moved into a game interface (or a visible portion of a game interface). In one embodiment, a block of symbols may comprise a single symbol which populates a plurality of symbol positions within the game interface in a predetermined configuration or pattern (e.g., an elongated single symbol which takes up more than one symbol position along a reel).

In accordance with some embodiments, an electronic game consistent with some embodiments may further include a cascade feature. In some embodiments, during a cascade feature a block of symbols may be manipulated differently than are the regular symbols of the game. For example, in one embodiment in which a cascade feature comprises removing from a game interface symbols which are part of a winning combination and replacing them with different symbols, a block of symbols (or at least a portion of the block of symbols) may remain within the game interface even if all or some of the symbols comprising the block (or a portion of the block) were part of a winning combination while all of the regular symbols which were part of at least one winning outcome along at least one payline are replaced. In one embodiment, a block of symbols may be "stepped out" of the game interface such that one symbol (or one portion of the symbol, in embodiments in which a block of symbols comprises a single elongated symbol which spans more than one symbol position) is removed from the game interface during each cascade, even if more than one contributed to the creation of a winning outcome along at least one payline. In accordance with some embodiments the block of symbols may remain intact for one cascade but, if additional cascades are triggered, the block of symbols may be moved out of the game interface (e.g., in a multi-stage process such that only a part of the block of symbols is moved off the game interface for each additional cascade). In accordance with some embodiments, a block of symbols may remain in the game interface for all cascades until no additional cascades are triggered In accordance with some embodiments, the symbol(s) comprising a block of symbol(s) may contribute to the creation of a winning outcome along a payline of the game. For example, one or more of the symbols comprising a block of symbols may function as a wild symbol. Or, in an example in which a block of symbols comprises a single symbol which spans more than one symbol position (such as an elongated symbol which spans more than one symbol position of a single reel), the block of symbols may function as a wild symbol in the symbol position over which it is placed. Although wild symbols have been used as one illustrative example, other types of special symbols may be used such that the symbol(s) comprising a block of symbols may function as another type of special symbol (e.g., a scatter symbol, a payout multiplier symbol, etc.). In other embodiments, the symbols comprising a block of symbols may not contribute to the creation of a winning outcome along a payline but, if a block of symbols is moved completely into a game interface, it will trigger a bonus or secondary mode of the game or result in some other benefit being provided to the player.

Applicants have recognized that games, whether wagering or non-wagering, are a popular past-time for millions of people all over the world. Electronic games in particular are becoming more and more popular, particularly ones playable online using a computer connected to a network. For example, according to some reports more than 200 million people play social games every month and online games recently passed e-mail as the second-most popular activity online, second only behind social networking. Accordingly, there is a need to continue to create exciting electronic games which maintain players' interest and stand out from the multitude of available online games.

Applicants have further realized that various "reel-type" or reeled slot machine games are popular with many players, whether deployed on dedicated gaming devices (e.g., a traditional slot machine device in a casino, operable primarily to facilitate one or more slot machine games) or on non-dedicated computing devices (e.g., personal computers, mobile devices, laptops or table computers, which are operable to perform a variety of functions in addition to supporting reeled slot machine games). A reeled slot machine game typically includes a plurality of reels, each reel including a plurality of symbol positions for display of a reel symbol. A symbol is a visual representation of an element or indicia used in the game to determine whether the player qualifies for an award. A reel symbol is a symbol output on a reel of a game interface. The term "symbol" as used herein may refer to a symbol placed on a reel of a reel-type slot game or a symbol of another type of game that is not a reel-type slot machine game (e.g., a game consisting of a grid, such as a bingo game, or any other type of interface that may be applied to embodiments described herein). A reel may be mechanical (e.g., in a physical dedicated gaming device on a casino floor) or virtual (e.g., a software representation of a reel on an electronic display of a dedicated or non-dedicated device). In a reel-type slot machine game the reels spin (or representations of virtual reels are made to look as if they spin) after a player places a wager on the game, provides another qualifying input or another reel-initiation event occurs. The reels then stop to display generated combinations of symbols on the reels. In some embodiments, symbols may also be placed (or re-place symbols otherwise placed on the reels) after the reels stop spinning. For example, in a game which includes a cascade feature, if a cascade feature is triggered by an outcome of the game, symbols may be removed from the reels and replaced with other reels (e.g., a block of symbols, regular symbols immediately above the removed symbols on the reels) after the reels stop spinning.

It should be noted that embodiments described herein are not limited to reel-type slot machine games. For example, the embodiments may be implemented in a card game (e.g., a multi-hand video poker game), a grid type game (e.g., a bingo game) or any type of game in which representations of outcomes are output in a configuration which lends itself to the wild symbol game mechanic described herein. Thus, it should be noted that although the term "spin" is used to refer to a game event which results in an outcome, the term "spin" is intended to encompass any type of game event (not limited to a game event in a reel-type slot machine game) for which an outcome may be determined.

The "outcome" of a spin or other type of game event, as the term is used herein, is the set of symbols as displayed in a set of symbol positions which are evaluated to determine whether the game event results in an award or prize. In a reel-type slot machine game, an outcome of a game event (or an outcome of a spin) may refer to the symbols displayed along symbol positions comprising one or more paylines of the game. If a generated symbol or combination of symbols is a winning symbol or combination of symbols (i.e., a symbol or combination of symbols associated with an award), the award corresponding to the winning symbol or winning symbol combination is provided or output (e.g., if the generated winning symbol or winning combination of symbols appears along an active payline associated with the reels or in a scatter pay of a reel-type slot machine game). The symbols along a payline at the end of a spin (i.e., once the reels are stopped and the symbols in the symbol positions are positioned such that a player may determine whether he/she qualifies for an award as a result of the spin) or at some other predetermined time during a game event at which symbols placed in the game interface are evaluated for winning combinations (e.g., once replacement symbols have been placed during a cascade feature) are referred to as the "outcome of the payline" herein. Thus, an outcome of a spin may comprise one or more outcomes of paylines. Further, an outcome of a payline may include a winning combination of symbols along with one or more additional symbols. For example, in a five (5) reel slot machine game, a payline may include five (5) symbol positions (e.g., one symbol position in each reel of the 5 (five) reels). However, one or more possible winning combinations of symbols may comprise three (3) or four (4) symbol combinations such that an occurrence of a winning combination of symbols along the payline will include the symbols comprising the winning combination as well as additional symbols that, while not part of the winning combination of symbols, are also along the payline and thus included in the outcome of the payline. For example, assume an occurrence of three (3) cherry symbols along a payline in a fruit-themed five (5) reel slot machine type game corresponds to an award of two (2) credits and an outcome of a spin includes the following symbols in the symbol positions comprising that payline: cherry-cherry-lemon-orange-cherry. In accordance with rules of one particular example game, the award corresponding to the three cherry symbols along the payline may be awarded to the player and the three cherry symbols may be referred to as the winning combination of symbols while the lemon and orange symbols are not part of the winning combination of symbols but are still part of the outcome of the payline. Such symbols which are part of an outcome of a payline but not symbols which are part of a winning combination of symbols along the payline are referred to herein as non-qualifying symbols herein. The symbols which are part of the winning combination and comprise the outcome of the payline are referred to as qualifying symbols herein.

One game feature available in some reeled games is the use of one or more wild symbols in some particular manners. A wild symbol is a symbol which may be placed in a symbol position of a reel and which changes, replaces or functions as one of the regular symbols on one of the reels (e.g., a wild symbol may be treated as equivalent to any of the regular symbols of the game). In some games a wild symbol is made to replace a regular symbol after the reels stop and an initial outcome for a payline or spin is displayed while in other game a wild symbol may be utilized on a reel to replace a regular symbol on a reel prior to any initial payline outcome being displayed to a player. Use of a wild symbol in a game enables, for example, changing of a first or non-winning combination of symbols to a second and possibly winning combination of symbols (e.g., to make a winning combination or align a winning combination on an active payline), thus increasing additional opportunities for winning combinations. Applicants have recognized that there is a continuing need for new ways of utilizing wild symbols in a reeled slot machine game to create added excitement and reward opportunities within the game.

It should be noted, as alluded to above, that a reference to "all" the reel positions of a reel herein may comprise a reference to all the reel positions visible to the player of the game as displayed on a game interface of the game. In some embodiments, there may be additional symbol positions of the game interface which are not visible to a player via a user interface at some phases of the game (e.g., a symbol position of a reel may not be visible to a player until the portion of the reel comprising that reel position is moved into a viewable user interface).

It should further be noted that while in some embodiments a block of symbols may first be determined and the game interface may be populated with the symbol(s) comprising the block of symbols in a first phase of determining an outcome for a spin or game instance while determining the regular symbols to populate the remaining symbol positions of the game interface may comprise a second phase of determining the outcome of the spin, in other embodiments the order or particular mechanic via which a block of symbols is determined and output in the game interface may differ. For example, in one alternate embodiment the regular symbols comprising an outcome of a spin may be determined in a known manner (e.g., using a random number generator to determine the outcome of the spin) and then it may be determined whether at least one block of symbols should replace a subset of the regular symbols comprising the outcome of the spin. For example, in one embodiment an inclusion of a wild symbol or some other predetermined symbol in an outcome of a spin may cause a block of symbols to replace one or more regular symbols of the outcome in the game interface.

In some embodiments in which symbols initially placed in symbol positions are replaced with other symbols (whether it be a block of symbols or other types of replacement symbols), an outcome of the spin determined prior to replacing the symbols which were initially placed in the symbol positions may be considered an initial outcome and the outcome after the replacing may be considered a modified outcome of the spin. The term "replacing" in this context is not intended to limit the scope of the embodiments to a traditional "replacement" in which the regular symbol is removed from the symbol position and another symbol (e.g., a wild symbol) which is part of a block of symbols is placed in the symbol position in its stead. In some embodiments, for example, "replacing" a regular symbol with another symbol (the "replacement symbol" herein) may comprise superimposing a semi-transparent image of the replacement symbol on the regular symbol, placing a depiction of the replacement symbol near the regular symbol in the symbol position and/or causing the symbol position to otherwise be designated as corresponding to a replacement symbol, such as by highlighting, shading, animating or otherwise altering the symbol position.

In some embodiments, determining the regular symbols for an outcome of a spin may be done in accordance with a process which comprises determining one or more outcomes (e.g., an outcome for each payline of the game and/or a regular symbol for each symbol position of the game) using a Random Number Generator (RNG), as would be understood by one of ordinary skill in the art. For example, at least one pseudo-random number generated by the RNG (e.g., based on an algorithm for generating pseudo-random numbers) may be determined for a particular spin, the at least one pseudo random number corresponding to particular regular symbols to appear in respective symbol positions visible to the player at the completion of the spin or to a total payout to be provided to the player as a result of the spin (and then selecting the regular symbols to display along active paylines for the spin in order to effectuate the total payout so determined). In some embodiments, a distinct pseudo-random number may be determined for at least one of (i) at least one active payline of the spin, (ii) at least one symbol position, and (iii) at least one reel (or other set of symbol positions in games which are not reel-based slot machine type of games). In either embodiment, the process for determining the symbols comprising an initial outcome of a spin may comprise determining, in some manner and based on an RNG, the particular symbols to be displayed on the symbol positions of each reel visible to the player at the completion of the spin. This process (and variations thereof described above) would be understood by one of ordinary skill in the art and may be referred to as a "first" process herein. The use of the term "first" in reference to a process for determining the regular symbols for an outcome of a spin is not intended to imply any order or sequence relevant to any other process described herein, it is used merely for convenience to distinguish such a process from other processes. For example, the first process may be done prior to, subsequent to or simultaneously with a determination of whether the outcome of the spin is to include at least one block of symbols and (in embodiments in which more than one block of symbols is available) which block(s) of symbols are to be included in the outcome of the spin.

As described, the present disclosure contemplates a second process which may be implemented in at least some embodiments described herein. Again, no order or sequence it intended to be implied or required by use of the term "second" in reference to the process of determining whether or which block(s) of symbols to include in an outcome of a spin, it is used merely to refer distinctly to this process versus another process. Such a second process may be employed to determine whether any blocks of symbols should be populated within the game interface for a game instance (e.g., as part of an outcome of a spin) and, in some embodiments in which multiple blocks of symbols are available, determining which block(s) of symbols to use for the particular game instance. For example, the second process may comprise determining that a block of symbols should be placed on a particular reel and/or which symbol positions of the particular reel are to be utilized (if the block of symbols does not populate all of the available symbol positions of the reel). In accordance with some embodiments, the second process may run or be executed essentially parallel to (e.g., run at the same time as) the first process for a given spin and the result of the first process may be overlaid or combined with the result of the first process before the reels stop spinning (i.e., prior to resolution of the spin), such that the outcome of the spin determined based on the first process is modified by a result of the second process. In other embodiments, the second process may be performed (i.e., the block(s) of symbols, if any, for the spin may be determined first) independently of the first process and the results of the first process may be utilized to populate the remaining symbol positions of the game interface which have not been populated based on the results of the second process. In some embodiments, the first process and the second process may comprise different subroutines or modules in a single process.

In one embodiment, a predetermined event in an initial outcome of a spin may trigger a block of symbols to replace one or more of the symbols initially placed in the game interface as part of the initial outcome. Examples of the predetermined event include, without limitation: (i) an appearance of one or more certain designated symbols (e.g., a wild symbol, a special symbol that signals a triggering of a block of symbols, etc.); (ii) a win of a payout over a predetermined amount (e.g., a minimum payout along a single payline or a sum of payouts along multiple paylines); and (iii) a lack of a payout for a predetermined number of spins. Thus, in some embodiments the first process and the second process described above may be performed in parallel or as a combined process, so as to determine whether the predetermined event is (or should be) included in the initial outcome of the spin and, if it is, determining the block of symbols (if more than one is available) or concluding that a block of symbols is to be output for the current game event. If it is determined that a block of symbols is to be output, in some embodiments the block of symbols may be output as part of the initial outcome while in other embodiments the block of symbols may be output as replacement symbol(s) for other symbols initially placed in the game interface as part of an initial outcome.

Certain aspects, advantages, and novel features of the invention(s) are described herein. It is to be understood that not necessarily all such advantages may be achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein.

Although several embodiments, examples and illustrations are disclosed below, it will be understood by those of ordinary skill in the art that the invention described herein extends beyond the specifically disclosed embodiments, examples and illustrations and includes other uses of the invention and obvious modifications and equivalents thereof. Embodiments of the invention(s) are described with reference to the accompanying figures, wherein like numerals refer to like elements throughout. The terminology used in the description presented herein is not intended to be interpreted in any limited or restrictive manner simply because it is being used in conjunction with a detailed description of certain specific embodiments of the invention(s). In addition, embodiments of the invention(s) can comprise several novel features and it is possible that no single feature is solely responsible for its desirable attributes or is essential to practicing the invention(s) herein described.

Throughout the description that follows and unless otherwise specified, the following terms may include and/or encompass the example meanings provided in this section. These terms and illustrative example meanings are provided to clarify the language selected to describe embodiments both in the specification and in the appended claims, and accordingly, are not intended to be limiting. Other terms are defined throughout the present description.

A "game", as the term is used herein unless specified otherwise, may comprise any game (e.g., wagering or non-wagering, electronically playable over a network) playable by one or more players in accordance with specified rules. A game may be playable on a personal computer online in web browsers, on a game console and/or on a mobile device such as a smart-phone or tablet computer. A game may also be playable on a dedicated gaming device (e.g., a slot machine in a brick-and-mortar casino). "Gaming" thus refers to play of a game.

A "casual game", as the term is used herein unless specified otherwise, may comprise a game with simple rules with little or no time commitment on the time of a player to play. A casual game may feature, for example, very simple game play such as a puzzle or Scrabble™ game, may allow for short bursts of play (e.g., during work breaks), an ability to quickly reach a final stage and/or continuous play without a need to save the game.

A "social network game", as used herein unless specified otherwise, refers to a type of online game that is played through a social network, and in some embodiments may feature multiplayer and asynchronous game play mechanics. A "social network" may refer to an online service, online community, platform, or site that focuses on facilitating the building of social networks or social relations among people. A social network service may, for example, consist of a representation of each user (often a profile), his/her social links, and a variety of additional services. A social network may be web-based and provide means for users to interact over the Internet, such as e-mail and instant messaging. A social network game may in some embodiments be implemented as a browser game, but can also be implemented on other platforms such as mobile devices.

A "wagering game", as the term is used herein, may comprise a game on which a player can risk a wager or other consideration, such as, but not limited to: slot games, poker games, blackjack, baccarat, craps, roulette, lottery, bingo, keno, casino war, etc. A wager may comprise a monetary wager in the form of an amount of currency or any other tangible or intangible article having some value which may be risked on an outcome of a wagering game. "Gambling" or "wagering" refers to play of a wagering game.

The term "game provider", as used herein unless specified otherwise, refers to an entity or system of components which provides, or facilitates the provision of, games for play and/or facilitates play of such game by use of a network such as the Internet or a proprietary or closed networks (e.g., an intranet or wide area network). For example, a game provider may operate a website which provides games in a digital format over the Internet. In some embodiments in which a game comprising a wagering game is provided, a game provider may operate or facilitate a gambling website over which wagers are accepted and results of wagering games are provided.

The terms "information" and "data", as used herein unless specified otherwise, may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard as defined by "Internet Protocol Version 6 (IPv6) Specification" RFC 1883, published by the Internet Engineering Task Force (IETF), Network Working Group, S. Deering et al. (December 1995). Information may, according to some embodiments, be compressed, encoded, encrypted, and/or otherwise packaged or manipulated in accordance with any method that is or becomes known or practicable.

The term "indication", as used herein unless specified otherwise, may refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

The term "network component," as used herein unless specified otherwise, may refer to a user or network device, or a component, piece, portion, or combination of user or network devices. Examples of network components may include a Static Random Access Memory (SRAM) device or module, a network processor, and a network communication path, connection, port, or cable.

In addition, some embodiments are associated with a "network" or a "communication network". As used herein, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. Networks may be or include a plurality of interconnected network devices. In some embodiments, networks may be hard-wired, wireless, virtual, neural, and/or any other configuration of type that is or becomes known. Communication networks may include, for example, one or more networks configured to operate in accordance with the Fast Ethernet LAN transmission standard 802.3-2002® published by the Institute of Electrical and Electronics Engineers (IEEE). In some embodiments, a network may include one or more wired and/or wireless networks operated in accordance with any communication standard or protocol that is or becomes known or practicable.

The term "player," as used herein unless specified otherwise, may refer to any type, quantity, and or manner of entity associated with the play of a game. In some embodiments, a player may comprise an entity (i) conducting play of an online game, (ii) that desires to play a game (e.g., an entity registered and/or scheduled to play and/or an entity having expressed interest in the play of the game—e.g., a spectator) and/or may (iii) that configures, manages, and/or conducts a game. A player may be currently playing a game or have previously played the game, or may not yet have initiated play—i.e., a "player" may comprise a "potential player" (e.g., in general and/or with respect to a specific game). In some embodiments, a player may comprise a user of an interface (e.g., whether or not such a player participates in a game or seeks to participate in the game).

Some embodiments described herein are associated with a "player device" or a "network device". As used herein, a "player device" is a subset of a "network device". The "network device", for example, may generally refer to any device that can communicate via a network, while the "player device" may comprise a network device that is owned and/or operated by or otherwise associated with a player. Examples of player and/or network devices may include, but are not limited to: a Personal Computer (PC), a computer workstation, a computer server, a printer, a scanner, a facsimile machine, a copier, a Personal Digital Assistant (PDA), a storage device (e.g., a disk drive), a hub, a router, a switch, and a modem, a video game console, or a wireless or cellular telephone. Player and/or network devices may, in some embodiments, comprise one or more network components.

A "session" comprises a period of time spanning a plurality of event instances, game instances, spins or turns of a game, the session having a defined start and defined end. An "event instance", "game instance", "session" or "turn" is triggered upon an initiation of, or request for, at least one result of the game by a player, such as an actuation of a "start" or "spin" mechanism, which initiation causes an outcome to be determined or generated (e.g., a random number generator is contacted or communicated with to identify, generate or determine a random number to be used to determine a result for the event instance). An event instance or turn may comprise an event instance or turn of a primary game or an event instance or turn of a bonus round, mode or feature of the game. Accordingly, a session may refer to a session of a primary game or a session of a bonus round, mode or feature of the game, depending on the context.

An "outcome" should be differentiated from a "result" in the present description in that an "outcome" is a representation of a "result", typically comprising one or more game elements or game symbols. For example, in a "fruit themed" game, a winning outcome (i.e., an outcome corresponding to some kind of award, prize or payout) may comprise a combination of three "cherry" symbols. The "result" of this outcome may be a payout of X credits awarded to the player associated with the game. In another example, in a game in which a character moves along a game interface from a starting position to a finish position, an "outcome" of the game may comprise a symbol representing one or more movements along the interface and the "result" corresponding to this outcome may be the particular number and direction of the character's movement. In a session embodiment, a session result may comprise a binary result (e.g., a player or game character wins or loses the session) and/or the particular award (or magnitude of award) won or earned by the player based on the session (e.g., the number of credits awarded to the player). It should be noted that the embodiments described herein encompass prizes which may comprise awards, payouts, discounts, eligibility, advancement in a game or other benefits (whether monetary or non-monetary, tangible or intangible) to a player and that any reference to a "prize", "award" or "payout" may refer to any or all of the foregoing, unless the context explicitly indicates otherwise.

A "bonus round", "bonus game", "bonus mode" or "bonus feature" of a game, as the terms are used interchangeably herein unless indicated otherwise, may refer to a secondary game, entry into which is triggered via one or more events which may occur in a base or primary game. Typically, a player may be able to qualify to play a bonus game based on one or more outcomes in a primary game, such as in a basic mode or a qualifying mode. A bonus round may be played in accordance with a set of rules that is different from those of a primary game, and may be accompanied by displays, colors, sounds, animated sequences, game play and/or prizes that are not part of the primary game. In one embodiment, a primary or base game application or program may include programming or instructions which will automatically begin a bonus round after the player has achieved a triggering event or qualifying condition in the base or primary game. For example, in some embodiments the blocks of symbols feature described herein may only be available in a bonus game or an occurrence of a block of symbols as part of an outcome of a spin may trigger a bonus mode or bonus round of the game. In other embodiments, the block of symbols feature may be part of the primary game.

"Virtual currency" as the term is used herein unless indicated otherwise, refers to an in-game currency that may be used as part of a game or one or more games provided by a game provider as (i) currency for making wagers, and/or (ii) to purchase or access various in-game items, features or powers. References to an "award", "prize" and/or "payout" herein are intended to encompass such in the form of virtual currency, credits, real currency or any other form of value, tangible or intangible.

A "credit balance", as the term is used herein unless indicated otherwise, refers to (i) a balance of currency, whether virtual currency or real currency, usable for making wagers or purchases in the game (or relevant to the game), and/or (ii) another tracking mechanism for tracking a player's success or advancement in a game by deducting therefrom points or value for unsuccessful attempts at advancement and adding thereto points or value for successful attempts at advancement. A credit balance may be increased or replenished with funds external to the game. For example, a player may transfer funds to the credit balance from a financial account or a gaming establishment may add funds to the credit balance due to a promotion, award or gift to the player.

II. Description of Figures

Example Systems

Referring now to the figures, FIG. 1 depicts a block diagram of an example system 100 according to some embodiments. The system 100 may comprise a plurality of player devices 102*a*-102*n* in communication with a game server 110 via a network 104. For purposes of brevity, any or all of the player devices 102*a*-102*n* will be referred to as a player device 102 herein, even though the plurality of player devices 102*a*-102*n* may include different types of player devices (as described below). The game server 110 may also be operable to communicate with or access a database 140 (which may comprise one or more databases and/or tables and which may comprise a storage device distinct from (or be a component of) the game server 110). It should be noted that in some embodiments database 140 may be stored on a game server 110 while in other embodiments database 140 may be stored on another computing device with which game server 110 is operable to communicate in order to at least access the data in database 140 (e.g., another server device remote from game server 110, operable to determine outcomes for an event instance of a game). In some embodiments a processor (e.g., one or more microprocessors, one or more microcontrollers, one or more digital signal processors) of a player device 102 and/or game server 110 may receive instructions (e.g., from a memory or like device), and execute those instructions, thereby performing one or more processes defined by those instructions. Instructions may be embodied in, e.g., one or more computer programs and/or one or more scripts.

In some embodiments a game server 110 and/or one or more of the player devices 102 stores and/or has access to data useful for facilitating play of a game consistent with one or more embodiments described herein. For example, game server 110 and/or a player device 102 may store (i) one or more probability databases for determining one or more outcome(s) for an event instance, spin or turn of a game, (ii) a current state or status of a game or game session (e.g., a number of cascades which have occurred for a spin initiated by a player in a reel-type slot machine game, a position of a block of symbols within a game interface, an indication of how much of a block of symbols remains within the game interface at a current time, etc.), (iii) one or more user interfaces for use in a game, (iv) one or more game themes for a game and/or (v) profiles or other personal information associated with a player of a game. It should be noted that in some embodiments such data may be stored on the game server 110 and information based on such data may be output to a player device 102 during play of a game (e.g., the player device may function as a client device which accesses game data from a remote server device using a web browser application of the player device). In other embodiments a game program may be downloaded to a local memory of a player device 102 and thus such data may be stored on a player device 102 (e.g., in encrypted or other secure or tamper-resistant form).

game server 110 may comprise a computing device for facilitating play of a game (e.g., by receiving an input from a player, determining an outcome for a game, causing an outcome of a game to be displayed on a player device, etc.). In some embodiments, a game server may be operable to perform at least one of (i) determining whether to include a block of symbols as part of an outcome of a spin; (ii) determining whether to replace one or more symbols of an outcome with a block of symbols (and/or which available block of symbols to include and where to place such block of symbols); (iii) manipulate a block of symbols within a game interface, such as by gradually moving the block of symbols out of the game interface over a course of a plurality of cascades; (iv) directing a player device as to how to modify a game interface to indicate progress in a game event; and (v) facilitating a wager and/or a provision of a payout for a game.

In some embodiments, the game server 110 may comprise a server computer operated by a game provider or another entity (e.g., a social network website not primarily directed at providing games). In some embodiments, the game server may determine an outcome for spin of a game by requesting and receiving such an outcome from another remote server operable to provide such outcomes. In some embodiments, the game server 110 may further be operable to facilitate one or more game programs, sub-routines or software modules for a game (e.g., a wagering game). In accordance with some embodiments, in addition to administering or facilitating play of a game, a game server 110 may comprise one or more computing devices responsible for handling online processes such as, but not limited to: serving a website comprising one or more games to a player device and/or processing transactions (e.g., wagers, deposits into financial accounts, managing accounts, controlling games, etc). In some embodiments, game server 110 may comprise two or more server computers operated by the same entity (e.g., one server being primarily for storing states of games in progress and another server being primarily for storing mechanisms for determining outcomes of games, such as a random number generator). Examples of processes that may be performed by the game server 110 (directly or indirectly) may include, but are not limited to: (i) determining regular symbols for an outcome of a spin based on a first process; (ii) determining whether to include at least one block of symbols as part of the outcome of the spin, in accordance with a second process; (iii) generating a modified outcome of the spin using the results of the first process and the second process; (iv) manipulating a block of symbols by moving it into or out of a game interface (e.g., over a course of a plurality of cascades, in some embodiments); (v) evaluating one or more paylines to determine whether the final outcome of the spin includes any winning outcomes of the paylines (and authorizing any corresponding payouts to be provided); (vi) facilitating any cascade which may be triggered as a result of any winning outcomes or other triggering conditions; (vii) re-evaluating one or more paylines of the game for any additional winning combinations created as a result of any cascading or replacing of symbols; (viii) facilitating any movement or re-positioning of a block of symbols within the game interface; (ix) authorizing a game program to be downloaded to a player device; and/or (ix) modifying (or directing a player device to modify) a game interface which is outputting an outcome of a payline to reflect any cascading, re-positioning and/or replacing of symbols.

Turning now to a description of a player device 102, in accordance with some embodiments a player device 102 may comprise a computing device that is operable to execute or facilitate the execution of at least one game program, sub-routine or software module for accessing an online casino or other electronic (e.g., online) game provider. For example, a player device 102 may comprise a desktop computer, computer workstation, laptop, mobile device, tablet computer, Personal Digital Assistant (PDA) devices, cellular or other wireless telephones (e.g., the Apple™ iPhone™), video game consoles (e.g., Microsoft™ Xbox 360™, Sony™ Plasystation™, and/or Nintendo™ Wii™), and/or handheld or portable video game devices (e.g., Nintendo™ Game Boy™ or Nintendo™ DS™). A player device 102 may comprise and/or interface with various components such as input and output devices (each of which is described in detail elsewhere herein) and, in some embodiments, game server 110. A player device 102 may be a dedicated gaming device (e.g., a slot machine) or a non-dedicated gaming device (e.g., an iPad™). It should be noted that a game server 110 may be in communication with a variety of different types of player devices 102.

A player device 102 may be used to play a wagering or non-wagering game (e.g., a social or casual game) over a network and output information relating to the game to players participating in the game (e.g., outcomes for an event instance of the game, qualifying for a bonus round of the game, credit balance of credits available for play of the game, a session result for a session of the game, etc.). Any and all information relevant to any of the aforementioned functions may be stored locally on one or more of the player devices 102 and/or may be accessed using one or more of the player devices 102 (in one embodiments such information being stored on, or provided via, the game server 110). In another embodiment, a player device 102 may store some or all of the program instructions for determining, for example, (i) that an event instance or game instance (e.g., a spin in a reeled slot machine game) has been triggered or initiated (and, in some embodiments, communicating such a trigger or initiation to game server 110), (ii) one or more outcome for the game instance (e.g., an initial outcome and one or more modified outcomes, such as may result from moving a block of symbols in/out of the game interface and/or one or more cascades of the game instance), and/or (iv) modifying a game interface to reflect events within the game (e.g., movement, replacement or re-positioning of regular game symbols or block(s) of symbols, adding additional regular symbols to the game interface or moving regular symbols downwards into lower symbol positions as a result of a cascade, etc.). In some embodiments, the game server 110 may be operable to authorize the one or more player devices 102 to access such information and/or program instructions remotely via the network 104 and/or download from the game server 110 (e.g., directly or via an intermediary server such as a web server) some or all of the program code for executing one or more of the various functions described in this disclosure. In other embodiments, outcome and result determinations may be carried out by the game server 110 (or another server with which the game server 110 communicates) and the player devices 102 may be terminals for displaying to an associated player such outcomes and results and other graphics and data related to a game. For example, in some embodiments a player device may access a server device as a client via a browser on the player device and the player may play a game consistent with at least some embodiments described herein by accessing the game interface using a browser rather than having game logic downloaded to the player device.

It should be noted that the one or more player devices 102 may each be located at the same location as at least one other player device 102 (e.g., such as in a casino or internet café) or remote from all other player devices 102. Similarly, any given player device may be located at the same location as the game server 110 or may be remote from the game server 110. It should further be noted that while the game server 110 may be useful or used by any of the player devices 102 to perform certain functions described herein, the game server 110 need not control any of the player devices 102. For example, in one embodiment the game server 110 may comprise a server hosting a website of an online casino accessed by one or more of the player devices 102 (e.g., via a web browser of the player device).

In one embodiment, a game server 110 may not be necessary or desirable. For example, some embodiments described in this disclosure may be practiced on one or more player devices 102 without a central authority. In such an embodiment, any functions described herein as performed by a game server 110 and/or data described as stored on a game server 110 may instead be performed by or stored on one or more player devices 102. Additional ways of distributing information and program instructions among one or more player devices 102, a game server 110 and/or another server device will be readily understood by one skilled in the art upon contemplation of the present disclosure.

Figure 2:
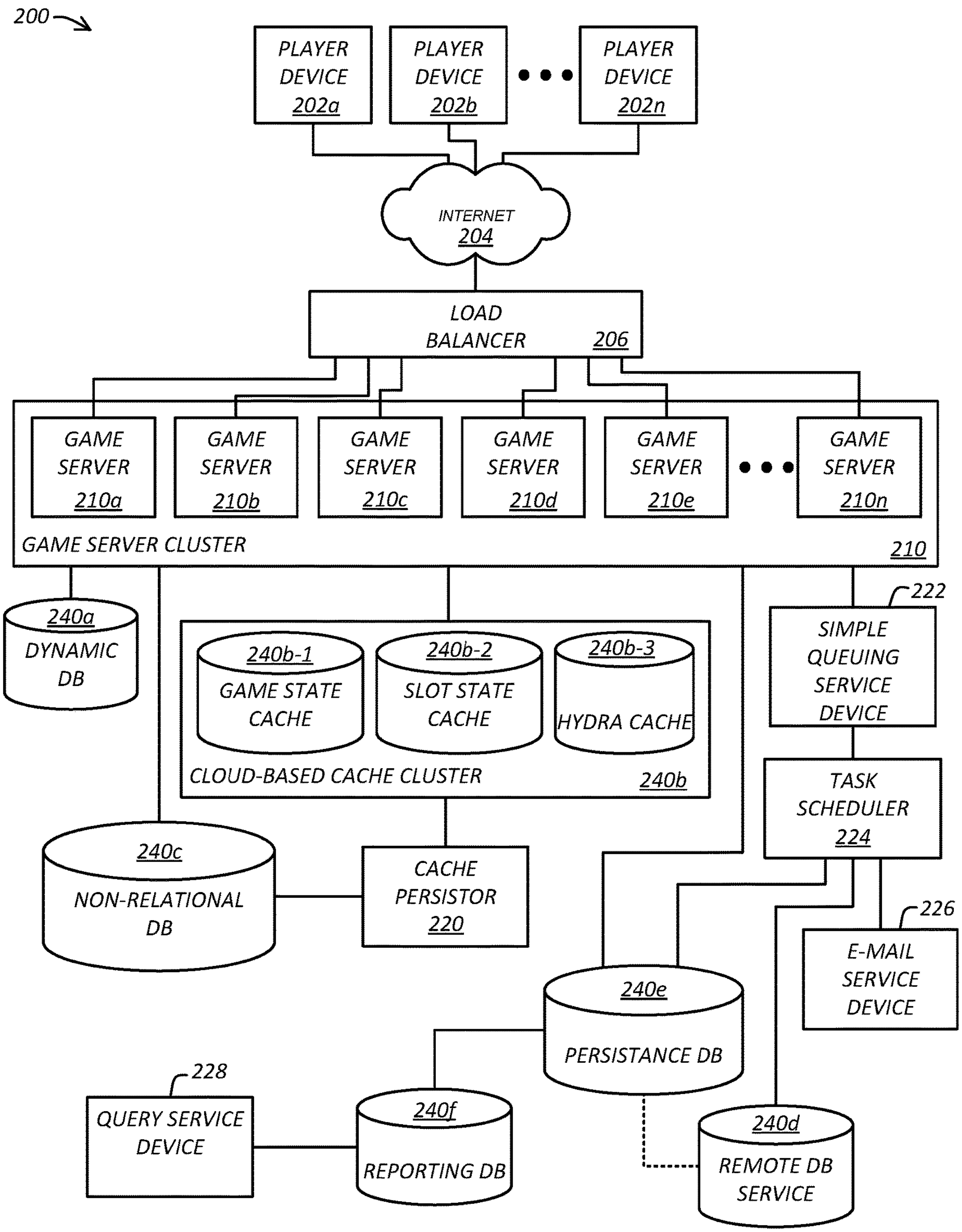
FIG. 2 is a schematic diagram of an embodiment of a social gaming platform in accordance with one or more embodiments described herein.

FIG. 2 a block diagram of an example system 200, which is consistent with some embodiments. In accordance with some embodiments, the system 200 may comprise a plurality of player devices 202*a-n*, the Internet 204, a load balancer 206, and/or a game server cluster 210. The game server cluster 210 may, in some embodiments, comprise a plurality of game servers 210*a-n*. In some embodiments, the system 200 may comprise a cache persistor 220, a Simple Queuing Service (SQS) device 222, a task scheduler 224, an e-mail service device 226, and/or a query service device 228. As depicted in FIG. 2, any or all of the various components 202*a-n*, 204, 206, 210*a-n*, 220, 222, 224, 226, 228 may be in communication with and/or coupled to one or more databases 240*a-f* The system 200 may comprise, for example, a dynamic DataBase (DB) 240*a*, a cloud-based cache cluster 240*b* (e.g., comprising a game state cache 240*b*-1, a slot state cache 240*b*-2, and/or a "hydra" cache 240*b*-3), a non-relational DB 240*c*, a remote DB service 240*d*, a persistence DB 240*e*, and/or a reporting DB 240*f*.

According to some embodiments, any or all of the components 202*a-n*, 204, 206, 210*a-n*, 220, 222, 224, 226, 228, 240*a-f* of the system 200 may be similar in configuration and/or functionality to any similarly named and/or numbered components described herein. Fewer or more components 202*a-n*, 204, 206, 210*a-n*, 220, 222, 224, 226, 228, 240*a-f* (and/or portions thereof) and/or various configurations of the components 202*a-n*, 204, 206, 210*a-n*, 220, 222, 224, 226, 228, 240*a-f* may be included in the system 200 without deviating from the scope of embodiments described herein. While multiple instances of some components 202*a-n*, 210*a-n*, 240*a-f* are depicted and while single instances of other components 204, 206, 220, 222, 224, 226, 228 are depicted, for example, any component 202*a-n*, 204, 206, 210*a-n*, 220, 222, 224, 226, 228, 240*a-f* depicted in the system 200 may comprise a single device, a combination of devices and/or components 202*a-n*, 204, 206, 210*a-n*, 220, 222, 224, 226, 228, 240*a-f*, and/or a plurality of devices, as is or becomes desirable and/or practicable. Similarly, in some embodiments, one or more of the various components 202*a-n*, 204, 206, 210*a-n*, 220, 222, 224, 226, 228, 240*a-f* may not be needed and/or desired in the system 200.

According to some embodiments, the player device 202*a-n* may be utilized to access (e.g., via the Internet 204 and/or one or more other networks not explicitly shown) content provided by the game server cluster 210. The game server cluster 210 may, for example, provide, manage, host, and/or conduct various online and/or otherwise electronic games such as online bingo, slots, poker, and/or other games of chance, skill, and/or combinations thereof. In some embodiments, the various game servers 210*a-n* (virtual and/or physical) of the game server cluster 210 may be configured to provide, manage, host, and/or conduct individual instances of available game types. A first game server 210*a*, for example, may host a first particular instance of an online reel-type slot game (or tournament), a second game server 210*c* may host a second particular instance of an online reel-type slot game (or tournament), a third game server 210*c* may facilitate an online poker tournament, and/or a fourth game server 210*d* may provide an online bingo game.

In some embodiments, the player devices 202*a-n* may comprise various components (hardware, firmware, and/or software; not explicitly shown) that facilitate game play and/or interaction with the game server cluster 210. The player device 202*a-n* may, for example, comprise a gaming client such as a software application programmed in Adobe® Flash® and/or HTML 5 that is configured to send requests to, and receive responses from, one or more of the game servers 210*a-n* of the game server cluster 210. In some embodiments, such an application operating on and/or via the player devices 202*a-n* may be configured in Model-View-Controller (MVC) architecture with a communication manager layer responsible for managing the requests to/responses from the game server cluster 210. In some embodiments, one or more of the game servers 210*a-n* may also or alternatively be configured in a MVC architecture with a communication manager and/or communications management layer. In some embodiments, communications between the player devices 202*a-n* and the game server cluster 210 may be conducted in accordance with the HyperText Transfer Protocol (HTTP) version 1.1 (HTTP/1.1) as published by the Internet Engineering Taskforce (IET) and the World Wide Web Consortium (W3C) in RFC 2616 (June 1999).

According to some embodiments, communications between the player devices 202*a-n* and the game server cluster 210 may be managed and/or facilitated by the load balancer 206. The load balancer 206 may, for example, route communications from player devices 202*a-n* to one or more of the specific game servers 210*a-n* depending upon various attributes and/or variables such as bandwidth availability (e.g., traffic management/volumetric load balancing), server load (e.g., processing load balancing), server functionality (e.g., contextual awareness/availability), and/or player-server history (e.g., session awareness/stickiness). In some embodiments, the load balancer 206 may comprise one or more devices and/or services provided by a third-party (not shown). The load balancer 206 may, for example, comprise an Elastic Load Balancer (ELB) service provided by Amazon® Web Services, LLC of Seattle, Wash. According to some embodiments, such as in the case that the load balancer 206 comprises the ELB or a similar service, the load balancer 206 may manage, set, determine, define, and/or otherwise influence the number of game servers 210*a-n* within the game server cluster 210. In the case that traffic and/or requests from the player devices 202*a-n* only require the first and second game servers 210*a-b*, for example, all other game servers 210*c-n* may be taken off-line, may not be initiated and/or called, and/or may otherwise not be required and/or utilized in the system 200. As demand increases (and/or if performance, security, and/or other issues cause one or more of the first and second game servers 210*a-b* to experience detrimental issues), the load balancer 206 may call and/or bring online one or more of the other game servers 210*c-n* depicted in FIG. 2. In the case that each game server 210*a-n* comprises an instance of an Amazon® Elastic Compute Cloud (EC2) service, the load balancer 206 may add or remove instances as is or becomes practicable and/or desirable.

In some embodiments, the load balancer 206 and/or the Internet 204 may comprise one or more proxy servers and/or devices (not shown in FIG. 2) via which communications between the player devices 202*a-n* and the game server cluster 210 are conducted and/or routed. Such proxy servers and/or devices may comprise one or more regional game hosting centers, for example, which may be geographically dispersed and addressable by player devices 202*a-n* in a given geographic proximity. In some embodiments, the proxy servers and/or devices may be located in one or more geographic areas and/or jurisdictions while the game server cluster 210 (and/or certain game servers 210*a-n* and/or groups of game servers 210*a-n* thereof) is located in a separate and/or remote geographic area and/or jurisdiction.

According to some embodiments, for some game types the game server cluster 210 may provide game outcomes to a controller device (not separately shown in FIG. 2) that times the release of game outcome information to the player devices 202*a-n* such as by utilizing a broadcaster device (also not separately shown in FIG. 2) that transmits the time-released game outcomes to the player devices 202*a-n* (e.g., in accordance with the Transmission Control Protocol (TCP) and Internet Protocol (IP) suite of communications protocols (TCP/IP), version 4, as defined by "Transmission Control Protocol" RFC 793 and/or "Internet Protocol" RFC 791, Defense Advance Research Projects Agency (DARPA), published by the Information Sciences Institute, University of Southern California, J. Postel, ed. (September 1981)).

In some embodiments, the game server cluster 210 (and/or one or more of the game servers 210*a-n* thereof) may be in communication with the dynamic DB 240*a*. According to some embodiments, the dynamic DB 240*a* may comprise a dynamically-scalable database service such as the DyanmoDB™ service provided by Amazon® Web Services, LLC. The dynamic DB 240*a* may, for example, store information specific to one or more certain game types (e.g., a reeled slots themed game) provided by the game server cluster 210 such as to allow, permit, and/or facilitate reporting and/or analysis of such information.

According to some embodiments, the game server cluster 210 (and/or one or more of the game servers 210*a-n* thereof) may be in communication with the cloud-based cache cluster 240*b*. Game state information from the game server cluster 210 may be stored in the game state cache 240*b*-1, for example, slot state (e.g., slot-game specific state) data may be stored in the slot state cache 240*b*-2, and/or other game and/or player information (e.g., progressive data, player rankings, audit data) may be stored in the hydra cache 240*b*-3. In some embodiments, the cache persistor 220 may move and/or copy data stored in the cloud-based cache cluster 240*b* to the non-relational DB 240*c*. The non-relational DB 240*c* may, for example, comprise a SimpleDB™ service provided by Amazon® Wed Services, LLC. According to some embodiments, the game server cluster 210 may generally access the cloud-based cache cluster 240*b* as-needed to store and/or retrieve game-related information. The data stored in the cloud-based cache cluster 240*b* may generally comprise a subset of the newest or freshest data, while the cache persistor 220 may archive and/or store or move such data to the non-relational DB 240*c* as it ages and/or becomes less relevant (e.g., once a player logs-off, once a game session and/or tournament ends). The game server cluster 210 may, in accordance with some embodiments, have access to the non-relational DB 240*c* as-needed and/or desired. The game servers 210*a-n* may, for example, be initialized with data from the non-relational DB 240*c* and/or may store and/or retrieve low frequency and/or low priority data via the non-relational DB 240*c*.

In some embodiments, the SQS device 222 may queue and/or otherwise manage requests, messages, events, and/or other tasks or calls to and/or from the server cluster 210. The SQS device 222 may, for example, prioritize and/or route requests between the game server cluster 210 and the task scheduler 224. In some embodiments, the SQS device 222 may provide mini-game and/or tournament information to the server cluster 210. According to some embodiments, the task scheduler 224 may initiate communications with the SQS device 222, the e-mail service provider 226 (e.g., providing e-mail lists), the remote DB service 240*d* (e.g., providing inserts and/or updates), and/or the persistence DB 240*e* (e.g., providing and/or updating game, player, and/or other reporting data), e.g., in accordance with one or more schedules.

According to some embodiments, the persistence DB 240*e* may comprise a data store of live environment game and/or player data. The game server cluster 210 and/or the task scheduler 224 or SQS device 222 may, for example, store game and/or player data to the persistence DB 240*e* and/or may pull and/or retrieve data from the persistence DB 240*e*, as-needed and/or desired. The server cluster 210 may, according to some embodiments, provide and/or retrieve spin and/or other game event info and/or configuration information via the persistence DB 240*e*.

In some embodiments, the reporting DB 240*f* may be created and/or populated based on the persistence DB 240*e*. On a scheduled and/or other basis, for example, a data transformation and/or mapping program may be utilized to pull data from the live environment (e.g., the persistence DB 240*e*) into the reporting DB 240*f*. The query service 228 may then be utilized, for example, to query the reporting DB 240*f*, without taxing the live environment and/or production system directly accessible by the game server cluster 210.

Figure 3:
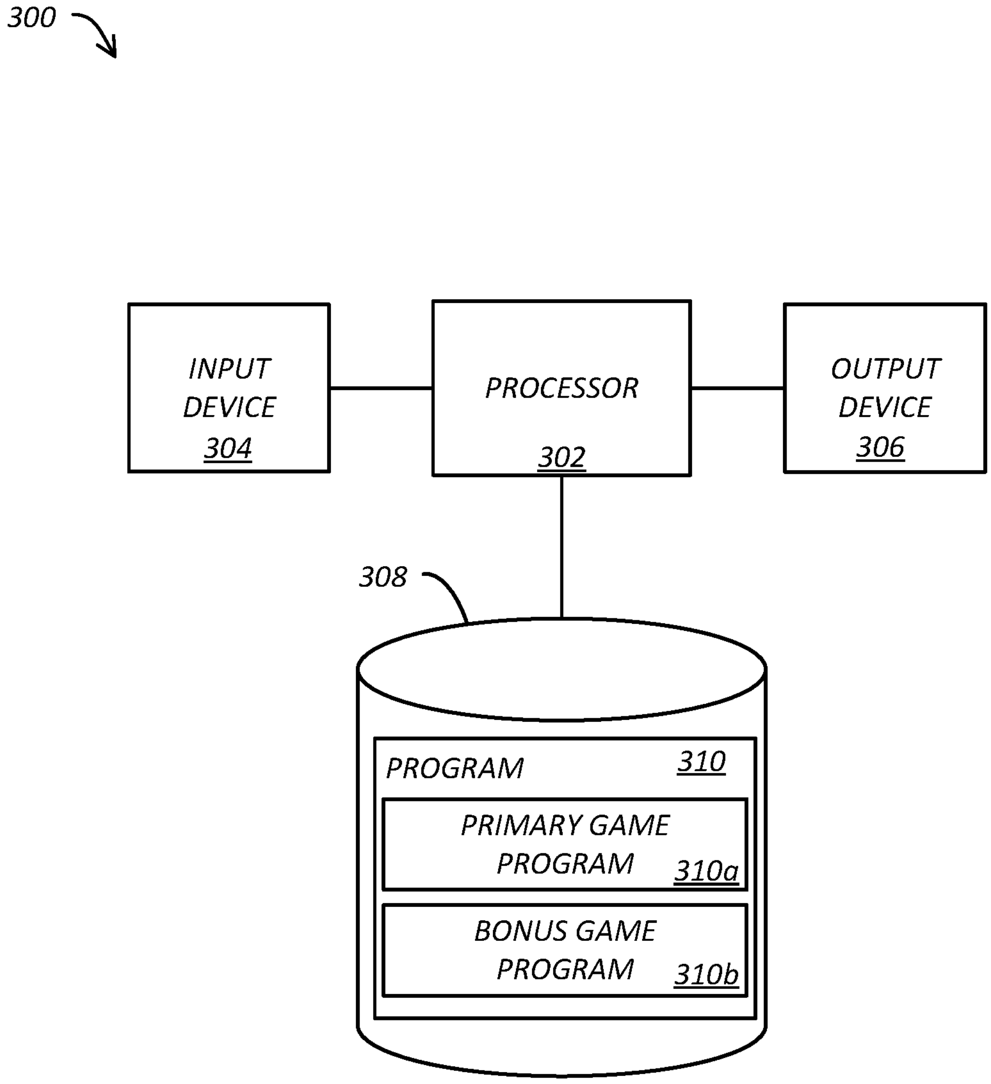
FIG. 3 is a block diagram of an embodiment of a computing device useful in a system according to one or more embodiments described herein.

FIG. 3 is a block diagram of an apparatus 300 according to some embodiments. In some embodiments, the apparatus 300 may be similar in configuration and/or functionality to any of the player devices 102, the game server 110 and/or another server device operable to facilitate the embodiments described herein. The apparatus 300 may, for example, execute, process, facilitate, and/or otherwise be associated with any of the process 500 described herein in conjunction with FIG. 5.

In some embodiments, the apparatus 300 may comprise a processor 302, an input device 304, an output device 306 and/or a memory device 308. Fewer or more components and/or various configurations of the components 302, 304, 306 and/or 308 may be included in the apparatus 300 without deviating from the scope of embodiments described herein.

According to some embodiments, the processor 302 may be or include any type, quantity, and/or configuration of processor that is or becomes known. The processor 302 may comprise, for example, an Intel® IXP 2800 network processor or an Intel® XEON™ Processor coupled with an Intel® E7501 chipset. In some embodiments, the processor 302 may comprise multiple inter-connected processors, microprocessors, and/or micro-engines. According to some embodiments, the processor 302 (and/or the apparatus 300 and/or other components thereof) may be supplied power via a power supply (not shown) such as a battery, an Alternating Current (AC) source, a Direct Current (DC) source, an AC/DC adapter, solar cells, and/or an inertial generator. In the case that the apparatus 302 comprises a server such as a blade server, necessary power may be supplied via a standard AC outlet, power strip, surge protector, and/or Uninterruptible Power Supply (UPS) device.

In some embodiments, the input device 304 and/or the output device 306 are communicatively coupled to the processor 302 (e.g., via wired and/or wireless connections and/or pathways) and they may generally comprise any types or configurations of input and output components and/or devices that are or become known, respectively.

The input device 304 may comprise, for example, a keyboard that allows an operator of the apparatus 300 to interface with the apparatus 200 (e.g., by a player, an employee or other worker affiliated with either an online casino or other entity operating a system which provides games to players). In some embodiments, the input device 304 may comprise a mechanism configured to indicate to a remote server device an initiation or triggering of an event instance (e.g., that a player has actuated a "reel spin" mechanism (e.g., a "soft" or virtual button on an online game interface) and thus initiated a new spin of a reels-based game), such information being provided to the apparatus 300 and/or the processor 302. In such embodiments, the input device may comprise a key on a keyboard of the apparatus 300 or a touch-sensitive screen of a device. Other examples of input devices include, but are not limited to: a game controller and/or gamepad, a bar-code scanner, a magnetic stripe reader, a pointing device (e.g., a computer mouse, touchpad, and/or trackball), a point-of-sale terminal keypad, a microphone, an infrared sensor, a sonic ranger, a computer port, a video camera, a motion detector, a digital camera, a network card, a Universal Serial Bus (USB) port, a GPS receiver, a Radio Frequency Identification (RFID) receiver, a RF receiver, a thermometer, a pressure sensor, and a weight scale or mass balance.

The output device 306 may, according to some embodiments, comprise a display screen and/or other practicable output component and/or device that is operable to output information. The output device 306 may, for example, comprise a display screen via which are output outcomes, instructions, guidance, questions or information to a player of a game. For example, the output device may output a game interface for a game which indicates an outcome of an event instance of the game, such as the symbols populated into respective ones of a plurality of symbol positions comprising the game interface and/or any payouts or other awards won or earned by a player as a result of an outcome of the game. Some additional examples of output devices that may be useful in some embodiments include a Cathode Ray Tube (CRT) monitor, a Liquid Crystal Display (LCD) screen, a Light Emitting Diode (LED) screen, a printer, an audio speaker, an Infra-red Radiation (IR) transmitter, an RF transmitter, and/or a data port. According to some embodiments, the input device 304 and/or the output device 306 may comprise and/or be embodied in a single device such as a touch-screen display or screen.

In some embodiments, the apparatus 300 may comprise any type or configuration of communication device (not shown) that is or becomes known or practicable. For example, the apparatus 300 may include a communication device such as a NIC, a telephonic device, a cellular network device, a router, a hub, a modem, and/or a communications port or cable. In some embodiments, the communication device may be coupled to provide data to a telecommunications device. The communication device may, for example, comprise a cellular telephone network transmission device that sends signals (e.g., an initiation of an event instance) to a server (e.g., game server 110) in communication with a plurality of player devices 102. According to some embodiments, the communication device may also or alternatively be coupled to the processor 302. In some embodiments, the communication device may comprise an IR, RF, Bluetooth™, and/or Wi-Fi® network device coupled to facilitate communications between the processor 202 and another device.

The memory device 308 may comprise any appropriate information storage device that is or becomes known or available, including, but not limited to, units and/or combinations of magnetic storage devices (e.g., a hard disk drive), optical storage devices, and/or semiconductor memory devices such as Random Access Memory (RAM) devices, Read Only Memory (ROM) devices, Single Data Rate Random Access Memory (SDR-RAM), Double Data Rate Random Access Memory (DDR-RAM), and/or Programmable Read Only Memory (PROM).

The memory device 308 may, according to some embodiments, store a program 310 for facilitating one or more of the embodiments described herein, which program may include a primary game program 310*a* for facilitating a primary aspect of a game and a bonus game program 310*b* for facilitating a bonus feature of the game, which may be relevant to some embodiments. In some embodiments, the primary game program 310*a* and/or the bonus round program 310*b* may be utilized by the processor 302 to provide output information via the output device 306.

In some embodiments, additional programs or software modules may be stored in memory device 308 or otherwise accessible to processor 302. In some embodiments, one or more of the primary game program 310*a* and the bonus round program 310*b* may comprise various sub-programs, sub-routines or software modules for facilitating different functionality. For example, any of an additional program, program 310*a* and/or program 310*b* may be a stand-alone program or may be part of a program, or set of programs providing various services to a user. For example the apparatus 300 may be facilitating a game event and within a program 310*a* or 310*b*, a section or module is provided to facilitate a manipulation of a block of symbols into the game interface, which section is executed at a relevant time. In some embodiments, the memory device 308 may store an additional program which is called by the primary game program 310*a* or the bonus round program 310*b* when required such that the same additional program can be used by multiple programs. For example, the memory device 308 may store a "game engine" program to provide core services which are utilized by a number of individual game programs to save duplication of software code.

The apparatus 300 may function as a computer terminal and/or server of an online casino or other entity operating to provide online games, receive and/or manage information related to online games. In some embodiments, the apparatus 300 may comprise a web server and/or other server device operable to accept wagers and determine random numbers based upon which outcomes for wagering games are determined (e.g., such that a player device may access the game facilitated by the apparatus 300 using a web browser stored on the player device). In some embodiments, the apparatus 300 may comprise an apparatus that is operable to interact with a player of an online game. In some embodiments, apparatus 300 may comprise a plurality of devices working together to accomplish the functionality described herein with respect to FIG. 3.

Any or all of the exemplary instructions and data types described herein and other practicable types of data may be stored in any number, type, and/or configuration of memory devices that is or becomes known. The memory device 308 may, for example, comprise one or more data tables or files, databases, table spaces, registers, and/or other storage structures. In some embodiments, multiple databases and/or storage structures (and/or multiple memory devices 308) may be utilized to store information associated with the apparatus 300. According to some embodiments, the memory device 308 may be incorporated into and/or otherwise coupled to the apparatus 300 (e.g., as shown) or may simply be accessible to the apparatus 200 (e.g., externally located and/or situated).

Example Interface

Figure 4:
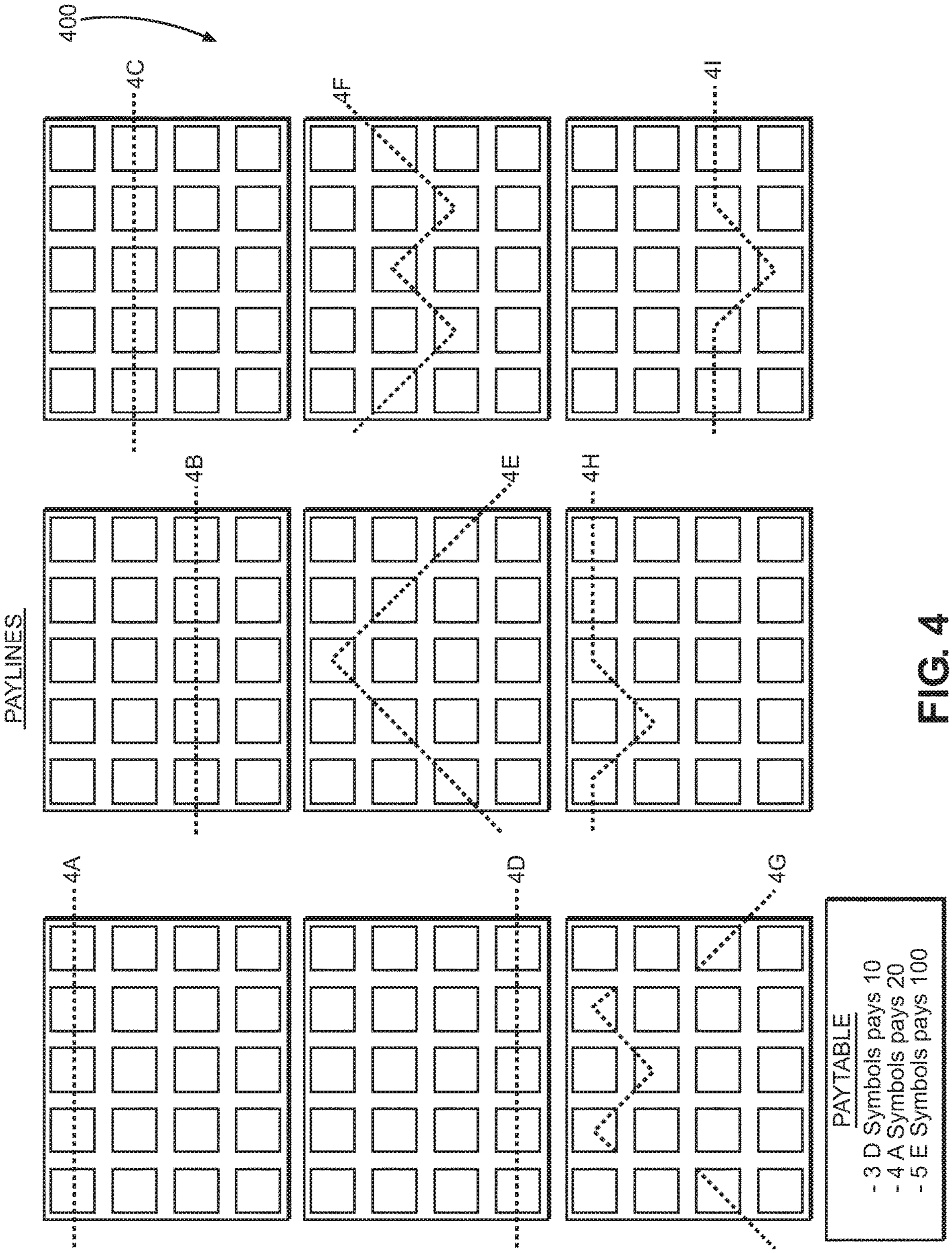
FIG. 4 is an illustration of one example user interface illustrating paylines which may be utilized to determine an outcome of a spin according to one or more embodiments described herein.

Turning now to FIG. 4, illustrated therein is an example game interfaces which embodies some embodiments described herein. In particular, FIG. 4 is a representation of the different paylines available in a game and the payout schedule for the game (e.g., winning combinations and the corresponding payout amounts). For example, a screen comprising the information of FIG. 4 (or similar information) may be output to a player who requests to see the paylines and payout schedule for the game. The paylines and payout schedule illustrated in FIG. 4 are utilized in the example embodiments described with respect to FIG. 5, as well as FIGS. 6A-6S, and will be referred to herein in the description of process 500. As illustrated in FIG. 4, there are nine (9) paylines in the game, referred to as paylines 4A, 4B, 4C, 4D, 4E, 4F, 4G, 4H and 4I. The particular symbol positions of a symbol matrix which make up each respective payline are depicted as having a dotted line passing through them.

The game represented in the game interface of FIG. 4 consists of five vertical reels, with each reel having four symbol positions visible to a player of the game. Of course, any number of reels or symbol positions within a reel may be used. The game interface illustrated in FIG. 4 may be thought of as having a 4×5 symbol matrix (4 rows and 5 columns (reels)). In accordance with one embodiment, FIG. 4 illustrates nine (9) possible paylines along which a winning combination of symbols may result in a payout or other prize being awarded to a player. Of course any number of reels, number of symbol positions on each reel or paylines may be utilized and the embodiments described herein are not dependent on any particular number or configuration of reels, symbol positions in a symbol matrix or number or configuration of paylines.

Although a reel-based slot machine-type game is used here to illustrate some embodiments, the embodiments are not limited to such an implementation. Many of the embodiments described herein may be applied to any game interface which includes symbols placed into symbol positions and a determination of whether a player qualifies for a prize based on whether the symbols located in a predetermined set or pattern of the symbol positions include a winning combination of symbols. For example, in a multi-hand card game in which a plurality of hands (e.g., a hand being a set of five cards) are arranged in rows of a symbol matrix, one embodiment may comprise replacing each card in a particular card position (e.g., each first card of each hand, each second card of each hand, etc.) with a wild card (or other special card) if a predetermined condition is satisfied (e.g., the total payout for the hands is at least X, at least a predetermined number (or all) of the hands qualify for a payout prior to the replacement. Other examples of different types of games to which the wild game mechanic described herein may be applied include, without limitation, bingo and keno.

For purposes of describing some embodiments, in the reel game interface of FIG. 4 (and the reel game interface illustrated within FIGS. 6A-6S), the top visible symbol position of a given reel is referred to as position "0" herein, the second from the top visible symbol position of a given reel is referred to as position "1" herein, the third from the top visible symbol position is referred to as position "2" herein and the fourth from the top visible symbol position is referred to as position "3" herein. Thus, for example, payline 4A in FIG. 4 consists of position "0" on each of the five reels; payline 4B consists of position "2" on each of the five reels and payline 4C consists of position "1" on each of the five reels.

Figure 6A:
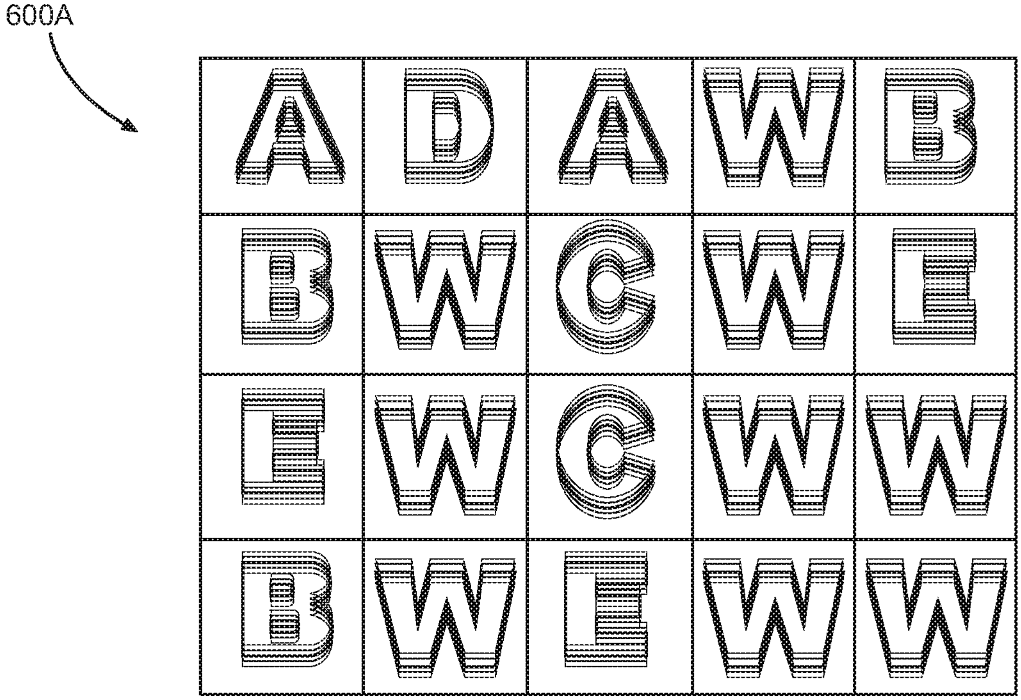
FIGS. 6A-6S comprise respective game interfaces which illustrate various mechanisms for manipulating blocks of symbols in accordance with at least some embodiments described herein.
Figure 6B:
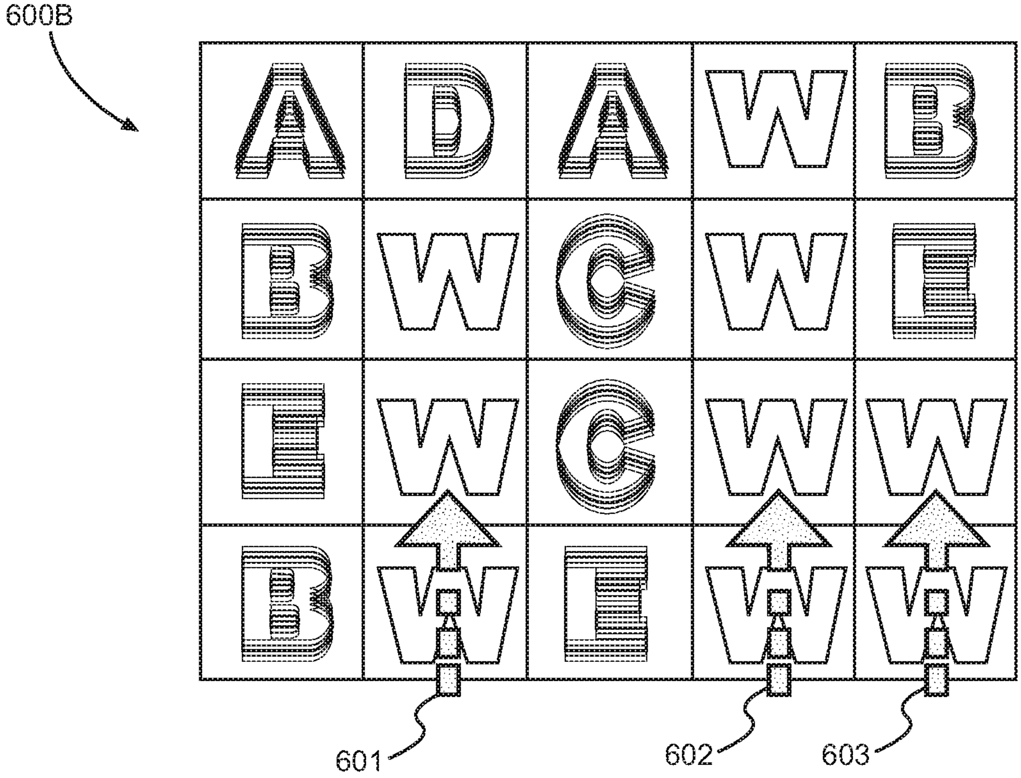
Figure 6C:
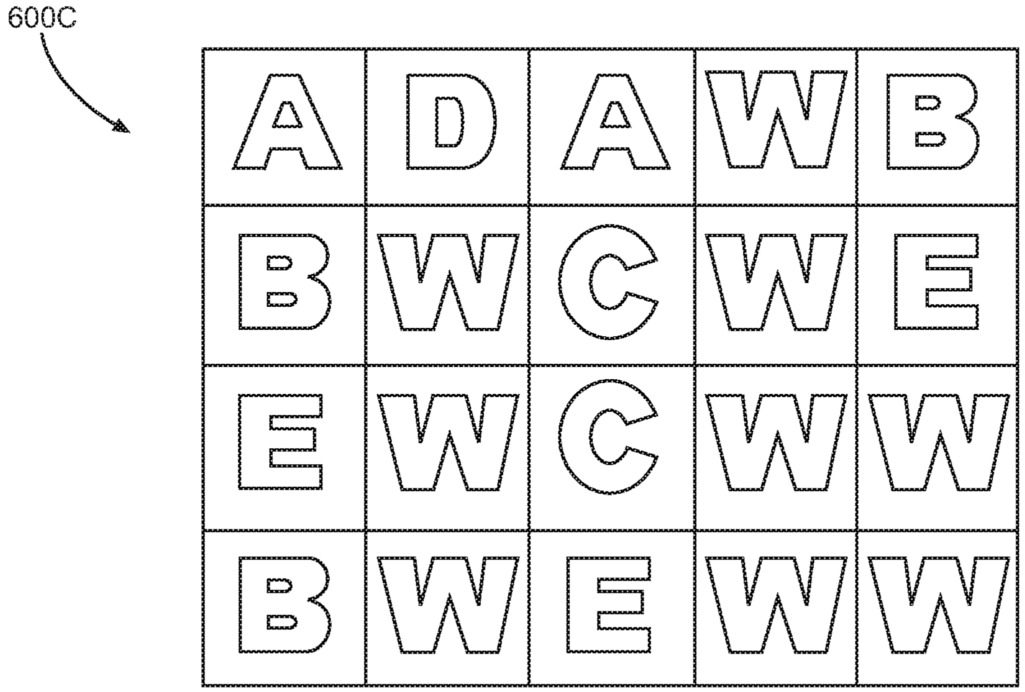
Figure 6D:
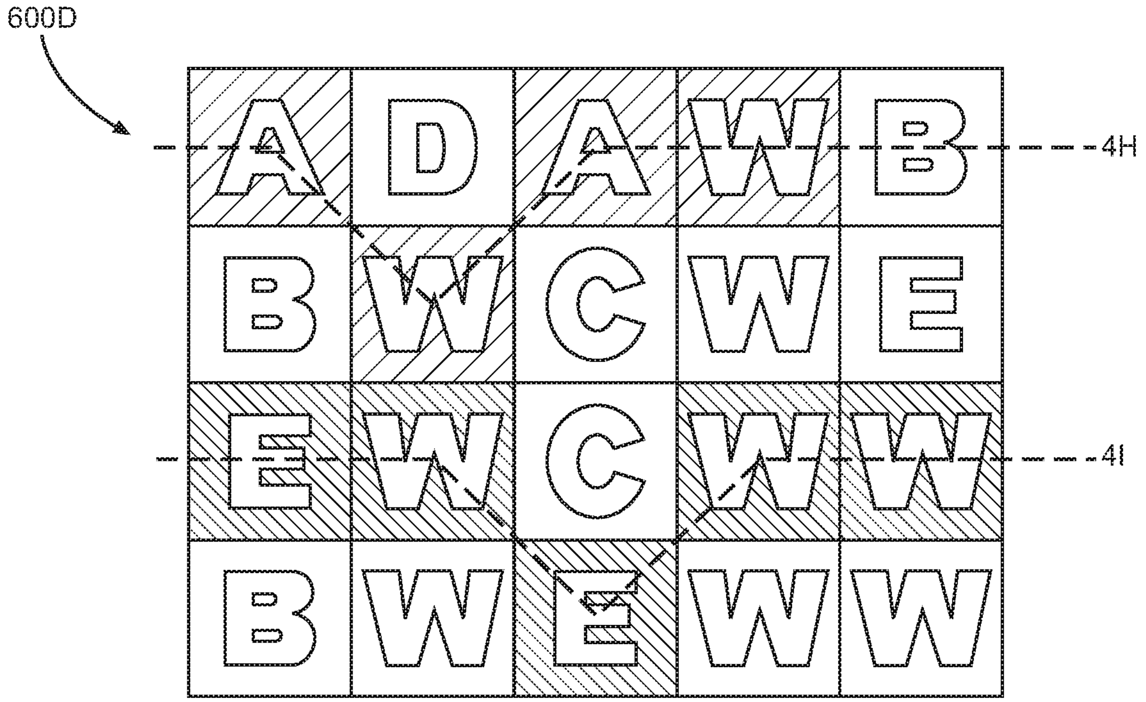
Figure 6E:
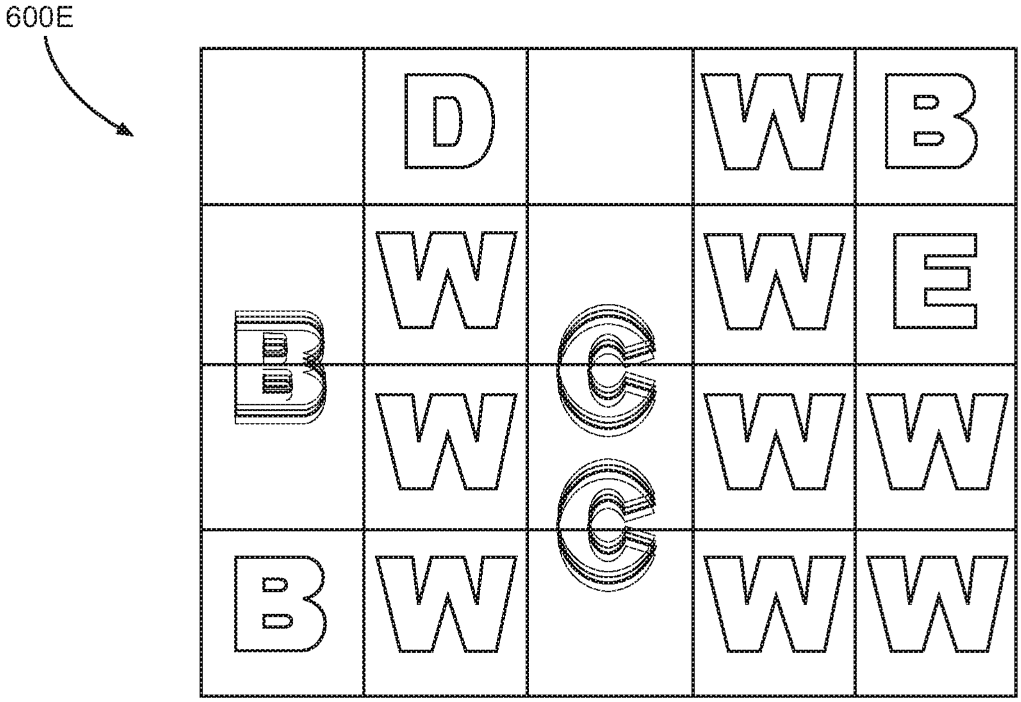
Figure 6F:
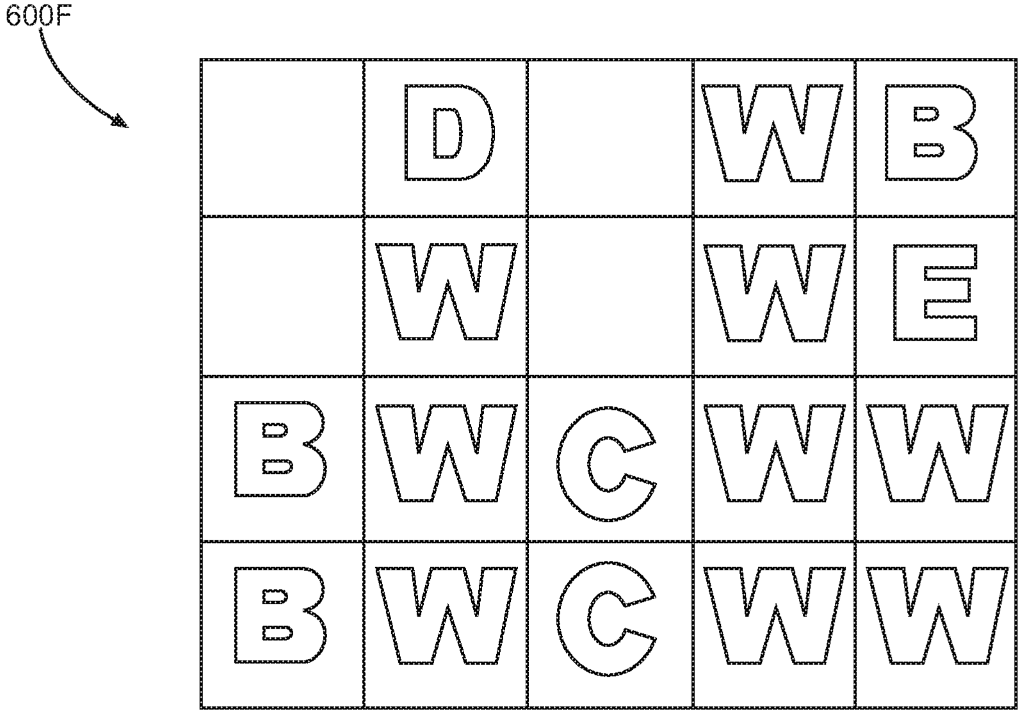
Figure 6G:
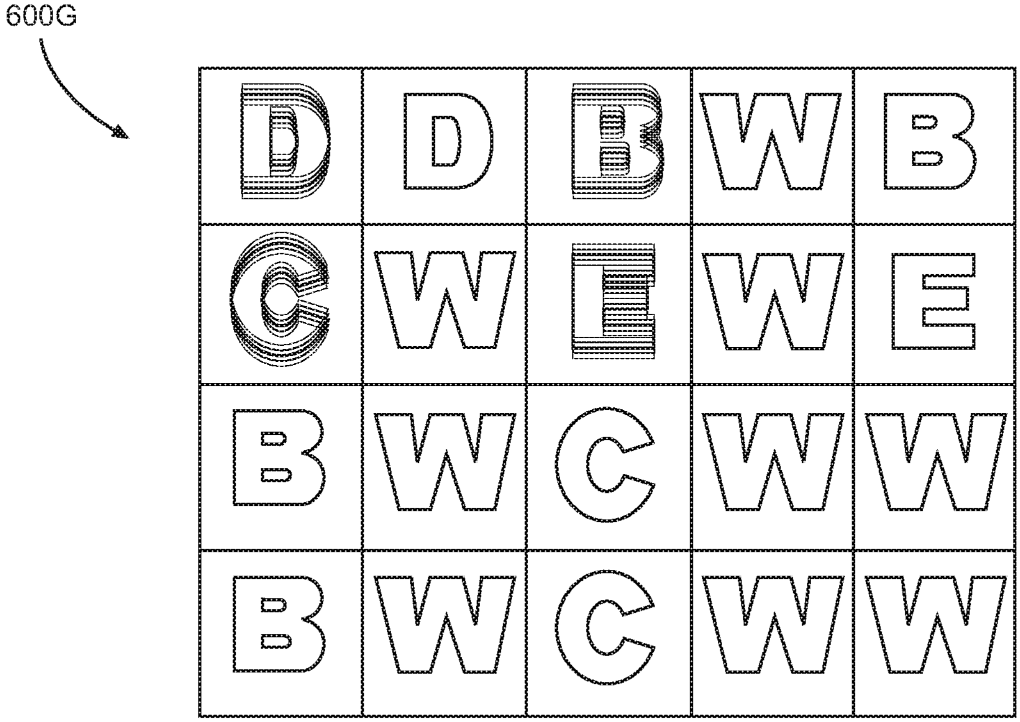
Figure 6H:
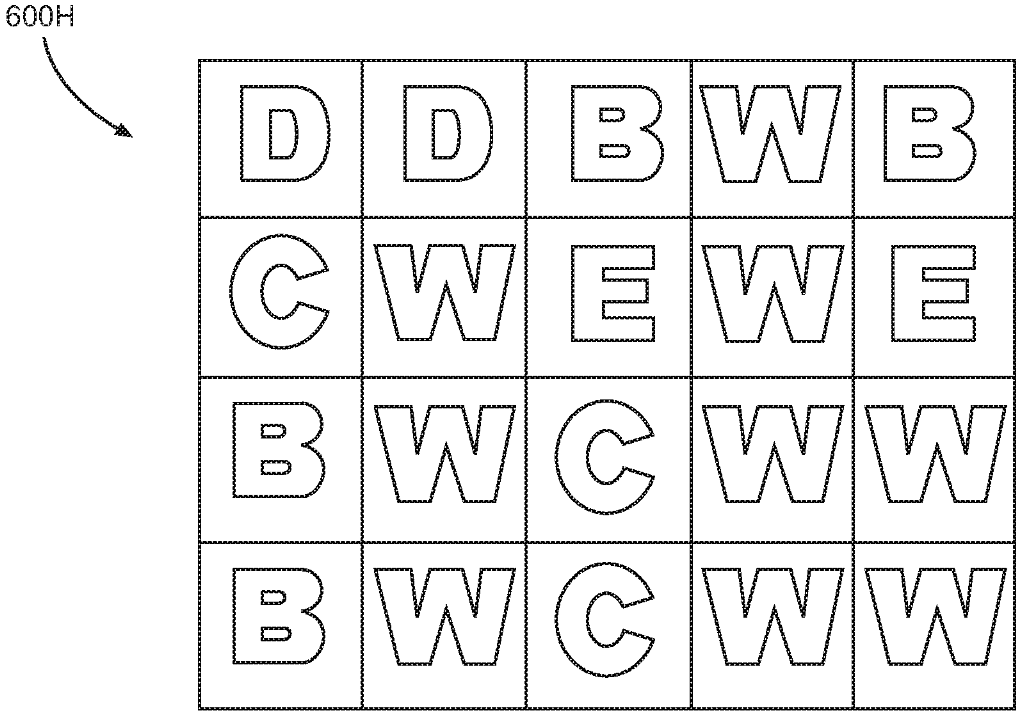
Figure 6I:
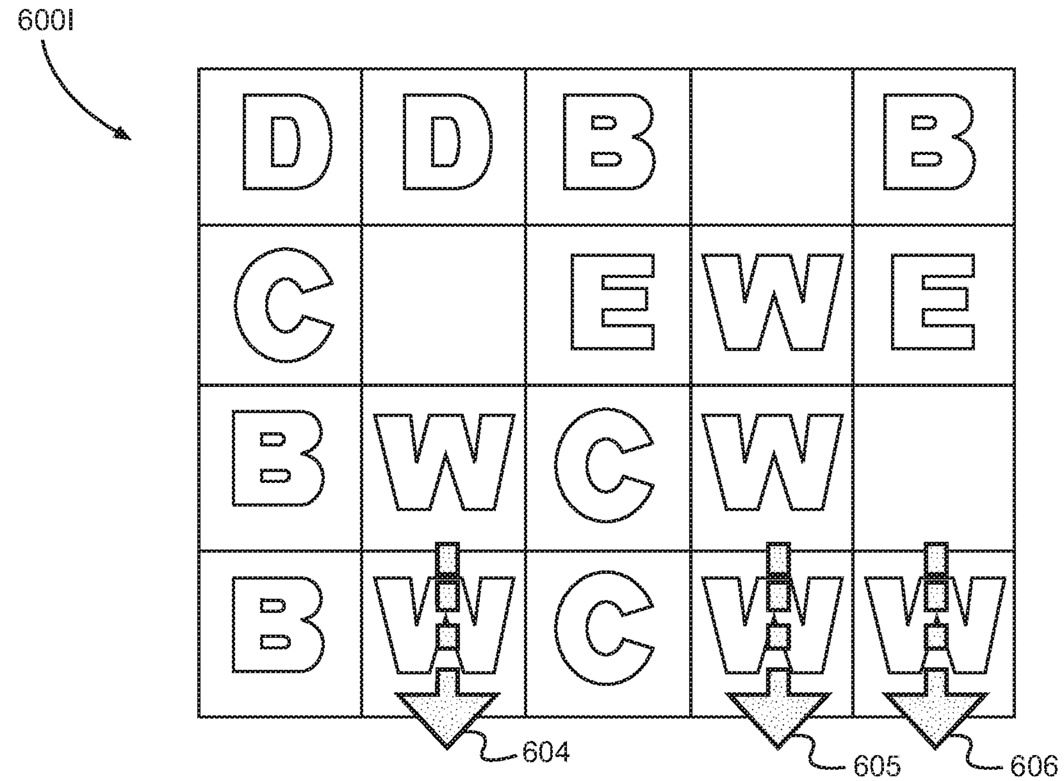
Figure 6J:
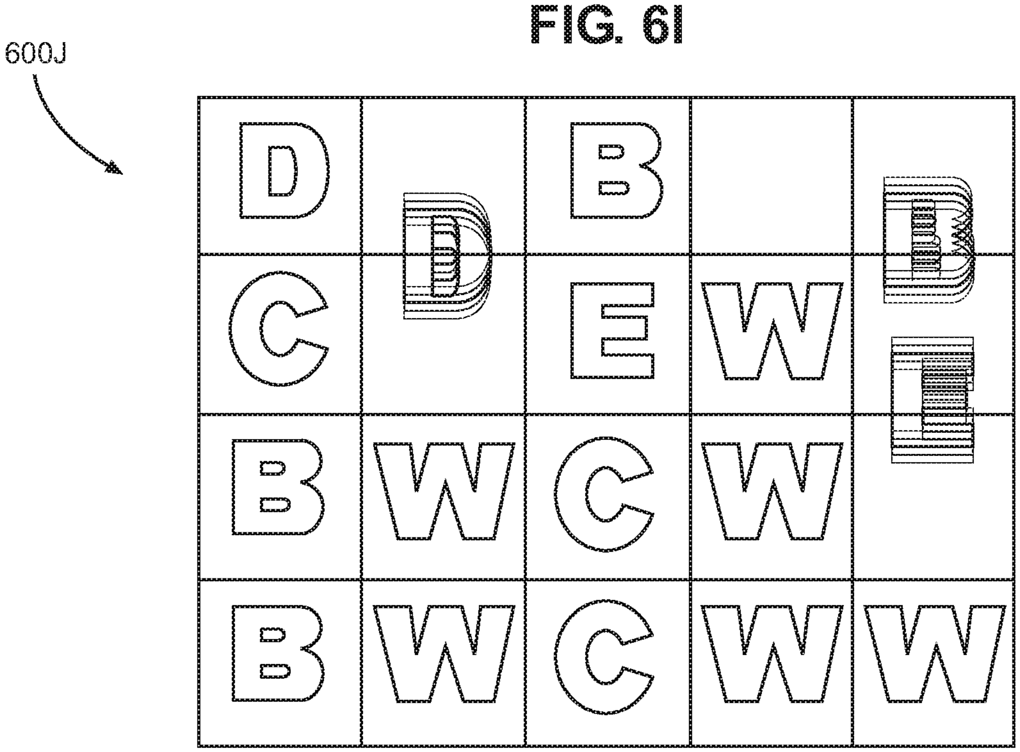
Figure 6K:
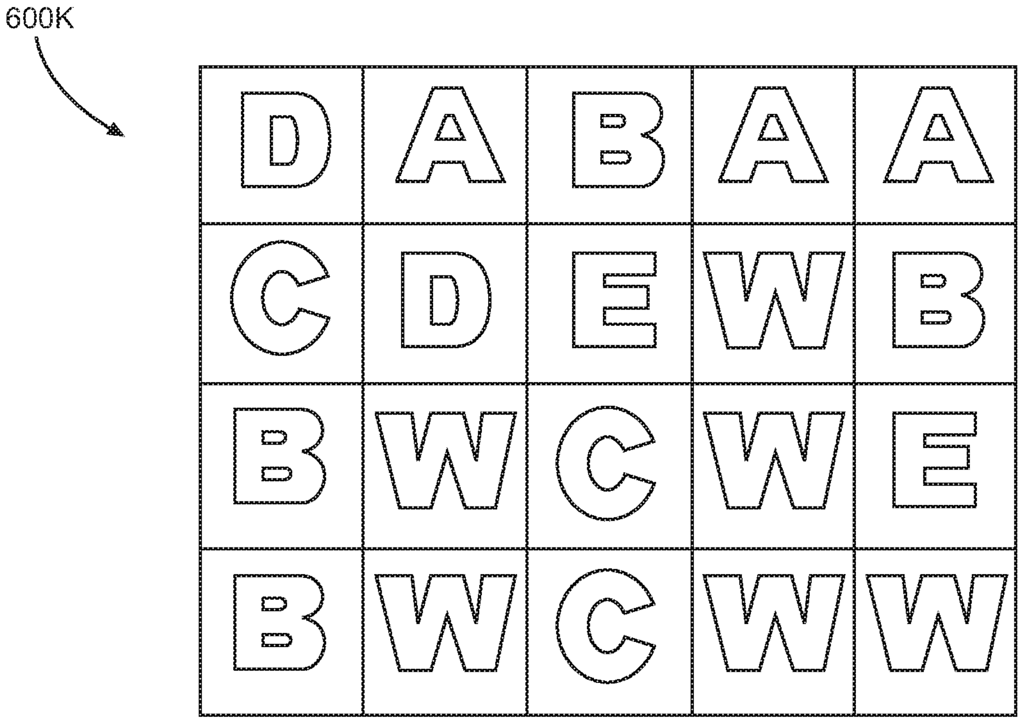
Figure 6L:
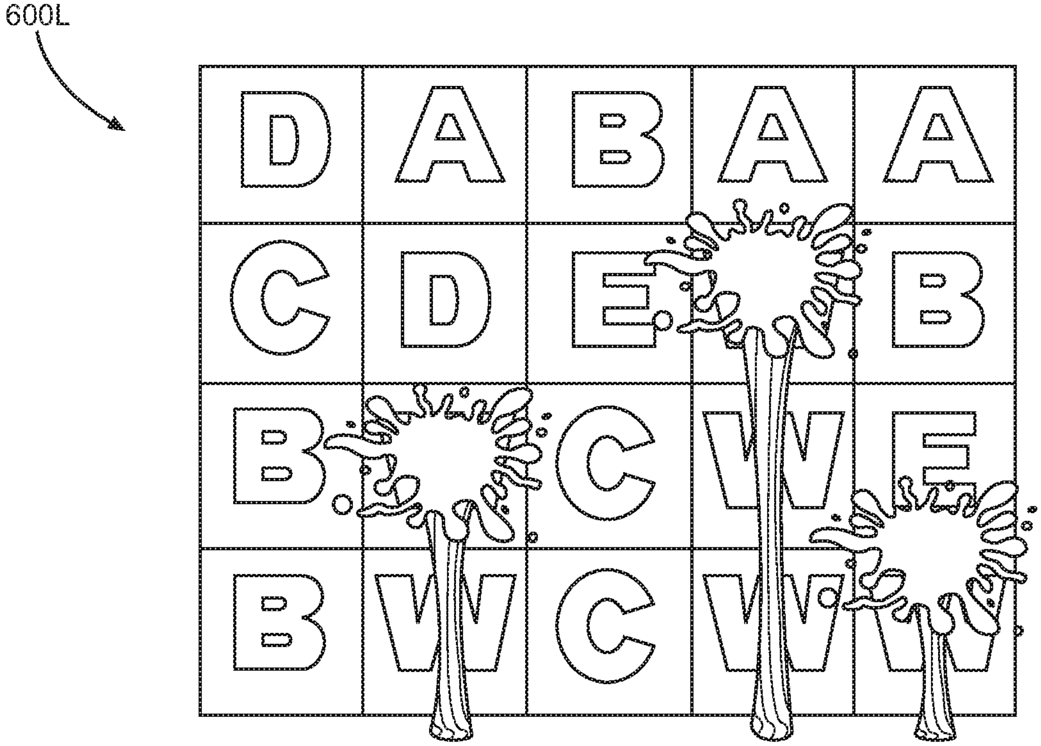
Figure 6N:
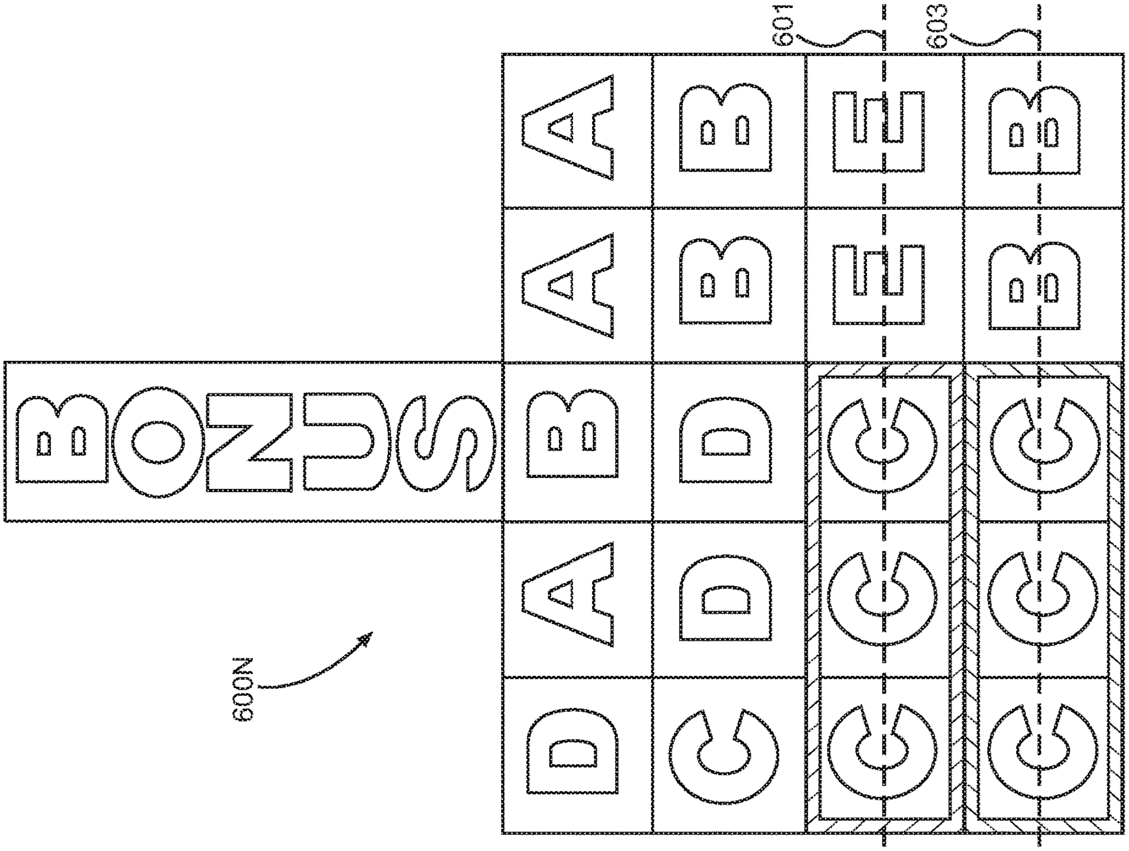
Figure 6M:
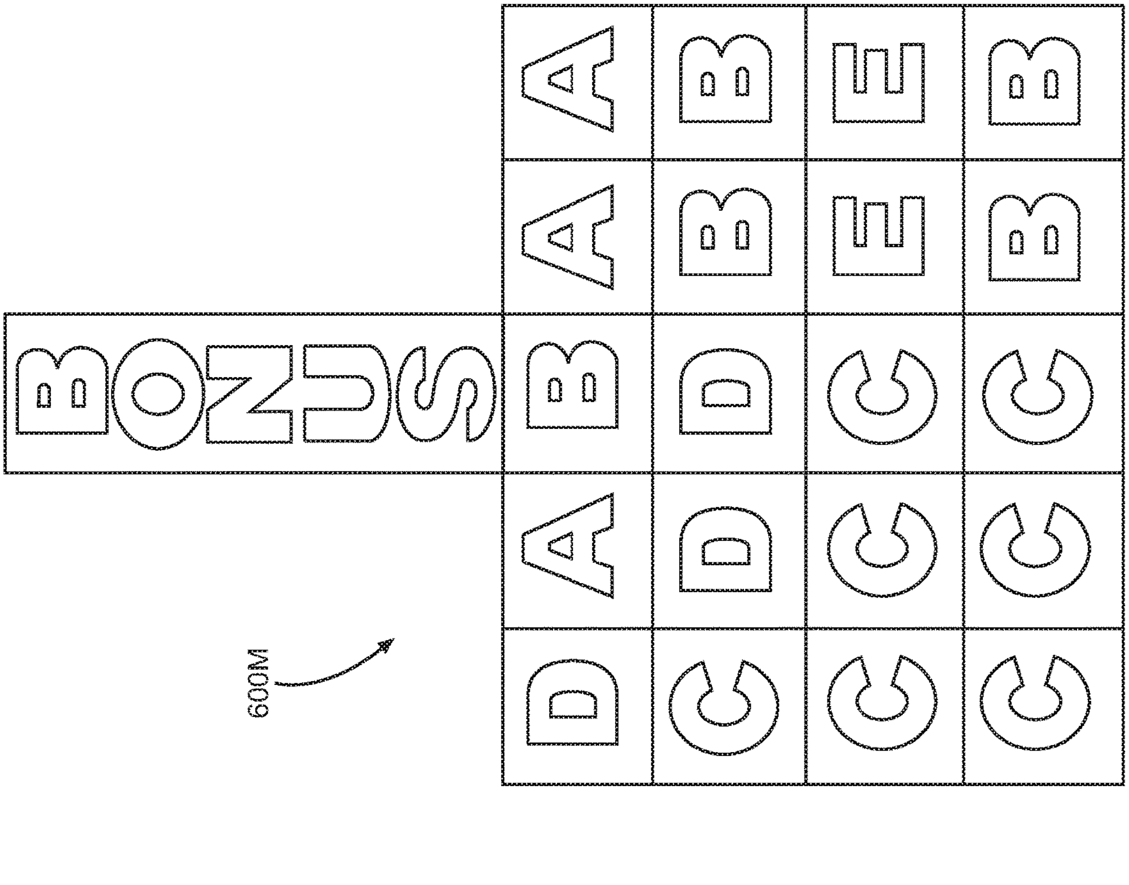
Figure 6P:
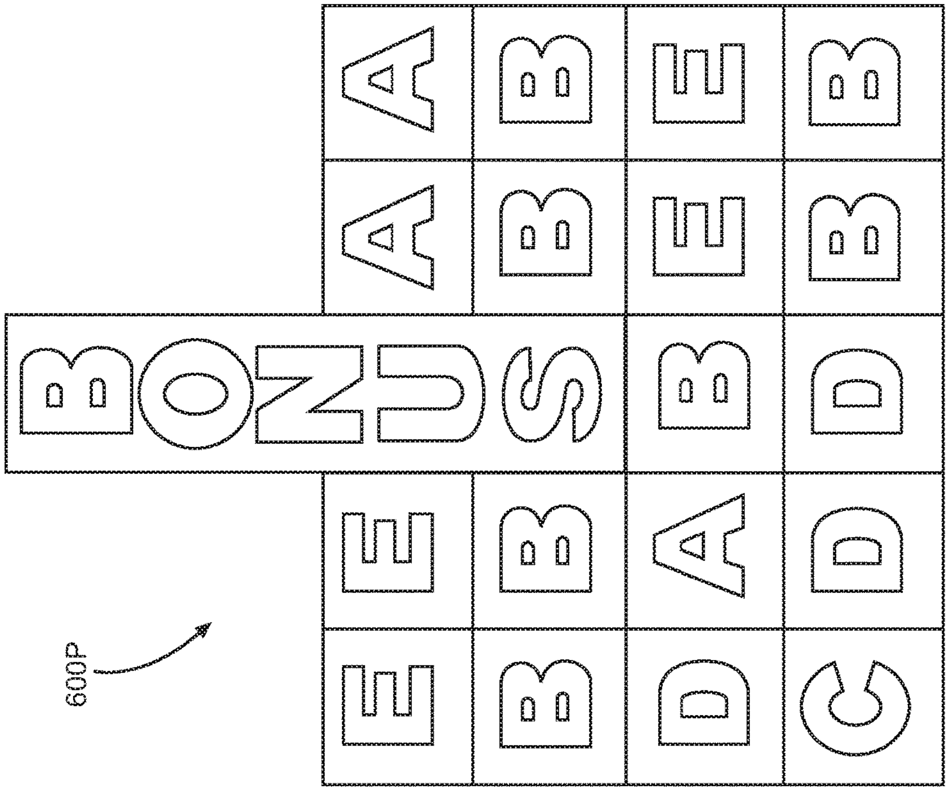
Figure 6O:
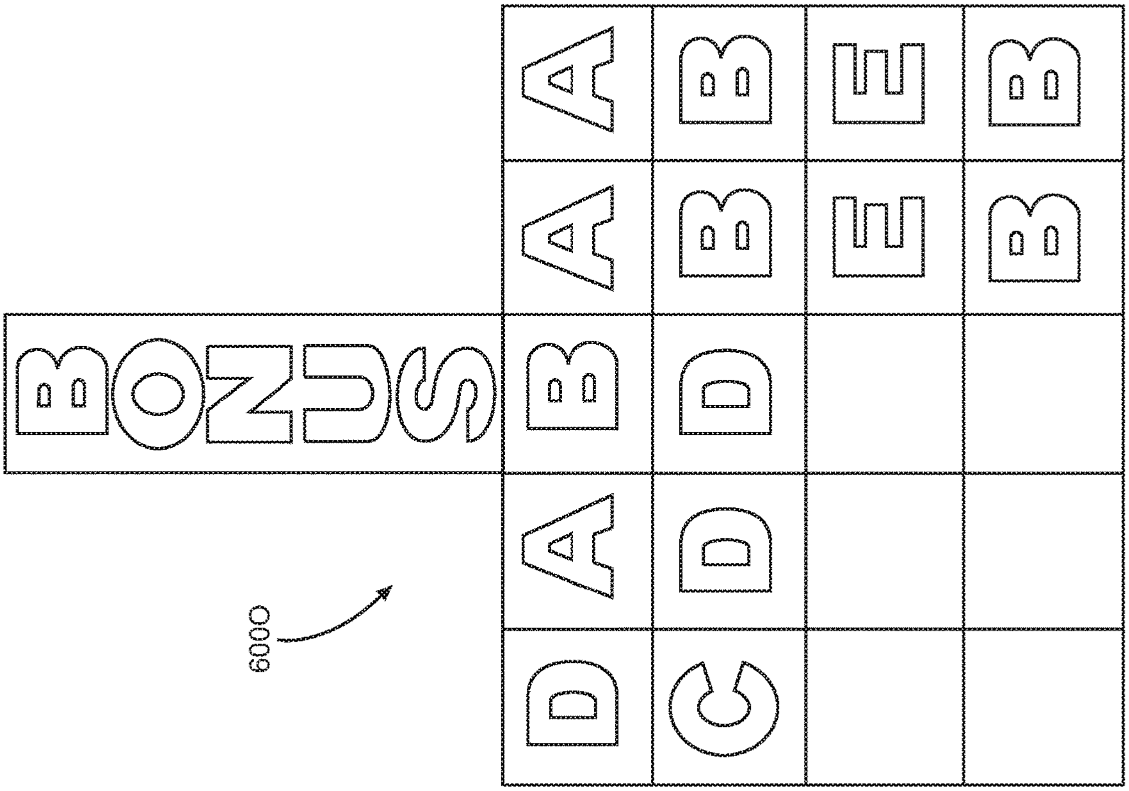
Figure 6R:
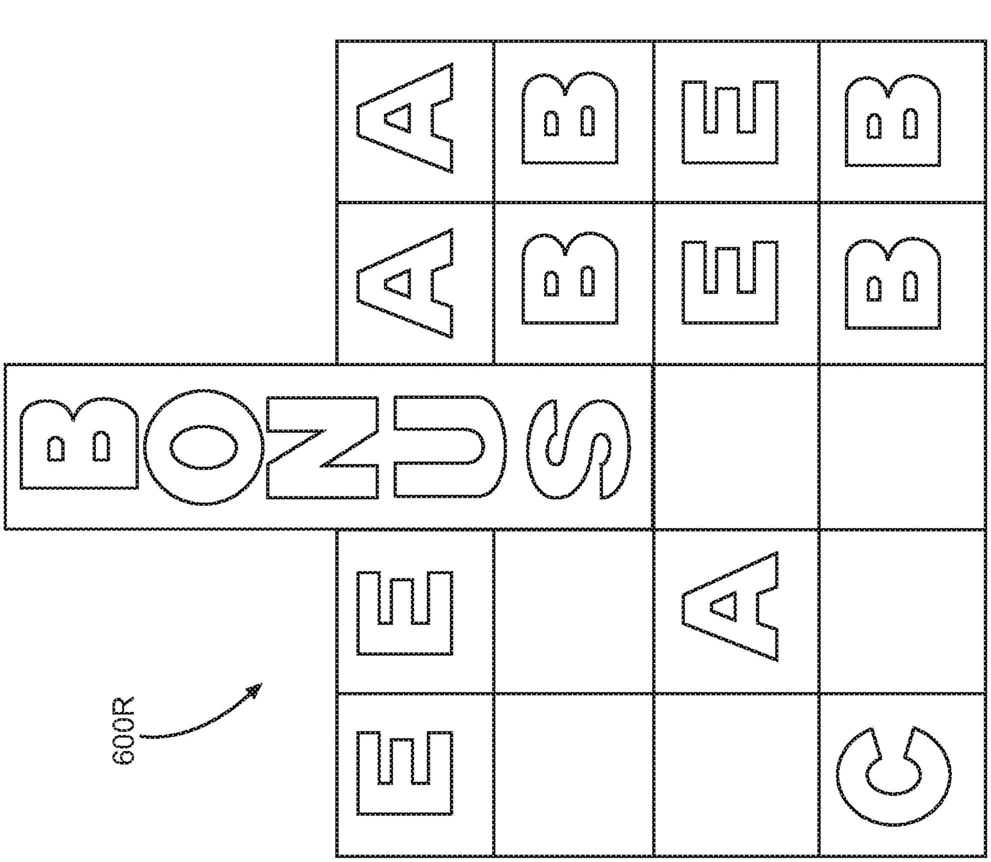
Figure 6Q:
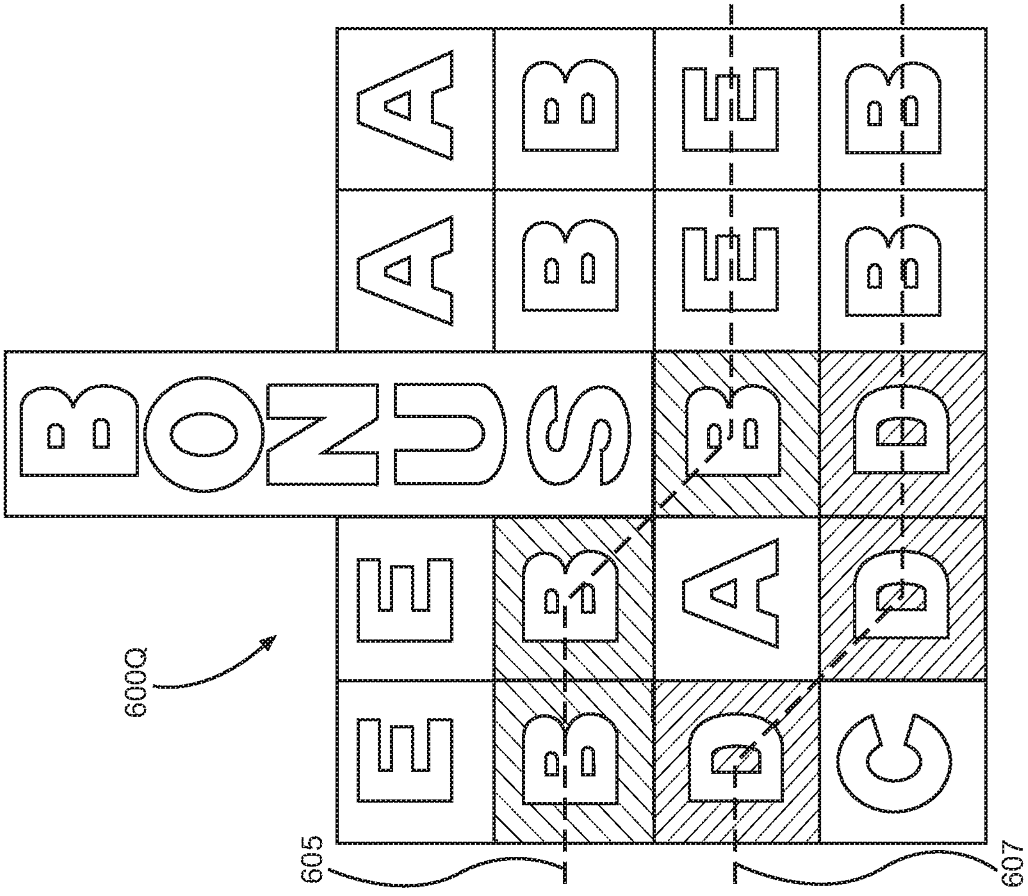
Figure 6S:
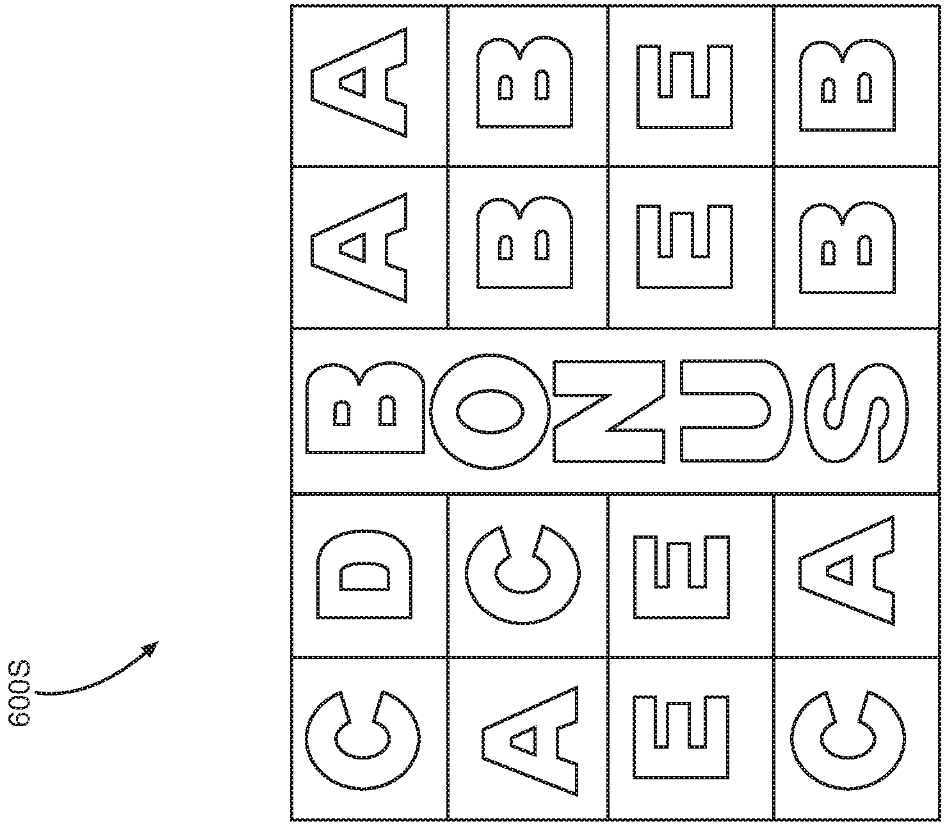

The example game depicted in FIGS. 4 and 6A through 6S is an "A-B-C-D-E" themed game in which the regular symbols are "A", "B", "C", "D" and "E" and a wild symbol ("W") may take the place of (or be counted as, for purposes of determining a winning combination of symbols) any of the regular symbols. Area 410 of FIG. 4 indicates which combinations of symbols are considered winning combinations and the corresponding payout for each winning combination. For purposes of brevity, only a simplistic model of winning combinations is illustrated: (i) three (3) "D" symbols along a given payline will result in a payout or award of ten (10) credits being provided to the player (e.g., added to a credit meter balance associated with the player; (ii) four (4) "A" symbols along a given payline will result in a payout of twenty (20) credits being provided to the player; and (iii) five (5) "E" symbols will result in a payout of one-hundred (100) credits being provided to the player.

It should be noted that, for purposes of the present description, any symbol which does not comprise a block of symbol(s) may be referred to as a regular symbol or regular game symbol herein. Thus, even symbols which correspond to special functionality (e.g., wild symbols, scatter symbols, multiplier symbols, bonus round triggering symbols, etc.) may be referred to as regular symbols herein, to indicate that they are not part of a block of symbol(s).

Example Processes

Figure 5:
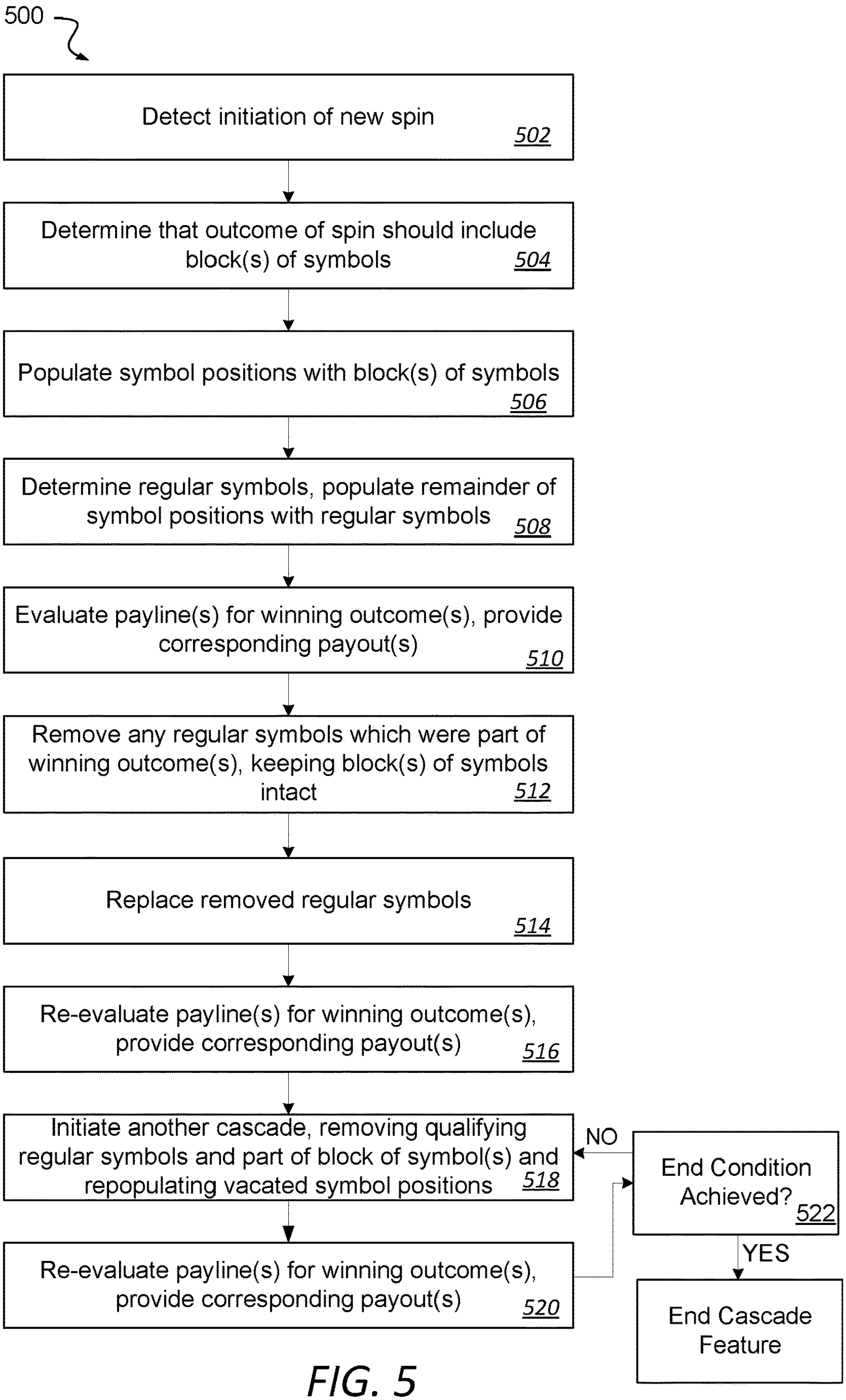
FIG. 5 is a flowchart illustrating a process according to one or more embodiments described herein.

Turning now to FIG. 5, illustrated therein is a process 500 for implementing some of the embodiments described herein. The process 500 may comprise respective processes for implementing the block(s) of symbols feature described herein, such as determining whether at least one block of symbols should be placed on a reel as part of an outcome of a game event. The process 500 may be performed, for example, by at least one of a server device operable to facilitate an electronic (e.g., online) game and/or a player device enabling a player to play the electronic (e.g., online) game. For example, the process 500 may be performed by at least one of (i) a player device 102 (FIG. 1); (ii) a game server 110 (FIG. 1); (iii) a player device 202 (FIG. 2); (iv) a game server 210 (FIG. 2); and (v) apparatus 300 (FIG. 3). It should be noted that additional and/or different steps may be added to those depicted and that not all steps depicted are necessary to any embodiment described herein. The process 500 is an example process of how some embodiments described herein may be implemented, and should not be taken in a limiting fashion. A person of ordinary skill in the art, upon contemplation of the embodiments described herein, may make various modifications to process 500 without departing from the spirit and scope of the embodiments in the possession of applicants.

The process 500 will be described with reference to FIG. 6A-6S, which comprise example user interfaces which may be output to a player in accordance with some embodiments described herein.

Turning now to FIG. 5, process 500 begins in step 502 with detecting an initiation of a new game event or game instance (e.g., an initiation of a new spin in a reeled slot machine game). For example step 502 may comprise determining that a player has placed a bet and initiated a game event (such as a reel spin) or receiving a request from a player device for an outcome.

In step 504 it is determined that the outcome of the game instance should include a block of symbol(s). In some embodiments step 504 may comprise determining whether the game instance should include a block of symbol(s). For example, in some embodiments only a subset of game instance outcomes will include at least one block of symbol(s) and an algorithm (e.g., a pseudo-random algorithm or a weighted algorithm) may be used to determine whether a particular outcome being determined for a game instance is to include at least one block of symbols. In some games, different and distinct blocks of symbol(s) may be available for use in outcomes of the game.

In some embodiments, the determination and/or placement of block(s) of symbol(s) may occur during a cascade feature of a game (e.g., during a cascade, as symbols are being removed, replaced and/or re-positioned within a game interface, a block of symbol(s) may be placed in, moved into and/or moved out of the game interface). In such embodiments, step 504 may comprise determining that a cascade feature of the game has been activated (i.e., the cascade may comprise the game instance or game event which has been detected).

In some embodiments, an output of a block of symbol(s) in the game interface may be triggered by an occurrence of a predetermined condition of the game. For example, in one embodiment, an inclusion of a wild symbol or another predetermined symbol in an initial outcome of a game event may cause a block of symbol(s) to be placed in or moved into the game interface. In a particular example, an inclusion of a wild or other predetermined symbol may cause a block of symbol(s) to replace a plurality of symbols initially output in the game interface. For example, the block of symbol(s) may replace a plurality of symbols which includes the wild or other predetermined symbol and/or symbols on the reel on which the wild or other predetermined symbol appeared.

In one embodiment, an entirety of a block of symbol(s) may be moved into the game simultaneously such that the entire block of symbol(s) is placed into the game interface prior to the next re-evaluation of paylines. In other embodiments, a block of symbol(s) may be moved into the game interface (e.g., moved onto a reel) in a multi-step process. For example, a portion of a block of symbol(s) may be moved into the game interface over a course of a plurality of game events (e.g., spins) of the primary game or a plurality of cascades during a cascade feature of the game. Similarly, a block of symbol(s) may be moved out of the game interface in a single step, such that the entire block of symbols is removed prior to the next re-evaluation of the paylines or in a multi-step process such that the block of symbol(s) is gradually moved out of the game interface over a course of a plurality of game events or cascades.

In embodiments in which different blocks of symbols are available for use, process 500 may further comprise determining which block(s) of symbol(s) to utilize in a particular outcome. For example, a probability table may be utilized along with a random number generator to determine which block of symbols to include in an outcome. In some embodiments, determining which block of symbol(s) to utilize may be based at least in part on factors such as (i) a player identifier, play history data or other data associated with the player for whom an outcome is being determined; and/or (ii) information about the game session which the game instance is occurring within (e.g., if a block of outcomes has not been included in the past X outcomes of the session, the probability of a block of outcome being included in the present outcome may be increased). In some embodiments, process 500 may also include determining where in the game interface the block(s) of symbols to be included in the outcome are to be placed. For example, process 500 may include (e.g., after determining that a block of symbols is to be included in an outcome) determining which reel to place a particular block of symbols on and/or which particular symbols of the reel the block of symbols is to be placed on. In other embodiments, the placement of the block of symbol(s) may be based at least in part on a triggering condition which causes the output of the block of symbol(s). For example, in one embodiment an inclusion of a wild symbol in an initial outcome of a game event may cause a block of symbol(s) to be output, and the block of symbol(s) may be output on the reel or other area of the game interface in which the wild symbol was placed.

In step 506 the at least one block of symbol(s) is placed within the game interface (e.g., on one or more reels in a reeled slot machine game). For example, assume that in step 504 the determination is that 3 bonus blocks will be generated and placed on the reels (a respective block of symbols on each of three of the available reels).

Referring now to an example game instance consistent with some embodiments, FIG. 6A depicts a game interface 600A comprising five reels which are spinning. FIG. 6A depicts a stage in a game instance when an outcome has not yet been output (e.g., after a new game instance has been initiated at the request of a player but before the reels stop spinning to reveal an outcome for the spin). FIG. 6B depicts a progression of the game instance from that illustrated in FIG. 6A. Specifically, FIG. 6A depicts that three blocks of symbols are being moved into the game interface 600B, one into the second reel from the left, one into the fourth reel from the left and one into the fifth reel from the left. In accordance with some embodiments, the three blocks of symbols are moved into the game interface 600B from the bottom up, rising in an upwards motion into the reel area during the spin (as indicated by the arrows 601, 602 and 603, which arrows would likely not be shown to a player during the game but are included in FIG. 6A for further clarity to illustrate the direction of motion for the blocks of symbols). Thus, in one embodiment, as illustrated in FIG. 6B, block(s) of symbol(s) may be placed into a game interface prior to the regular symbols of the game being placed to indicate an outcome of the spin. Of course, in other embodiments the sequence of how a block of symbols is introduced may differ (e.g., the block of symbols may be introduced simultaneously with the regular symbols comprising the remainder of the outcome or may be introduced after the regular symbols (e.g., the block of symbols may replace any regular symbols previously placed in the symbol matrix).

It should be noted that the symbols comprising blocks of symbols in FIG. 6B and other figures are Wild symbols (as indicated by the letter "W"). While Wild symbols may be used as comprising blocks of symbols in accordance with some embodiments, any type of symbol (including regular symbols utilized in the game) may be utilized. Further, not all symbols within a given block of symbols need be the same symbol or type of symbol.

In step 508, the regular symbols for the remainder of the symbol positions (i.e., the symbol positions not designated for occupation by symbol(s) comprising a block of symbols) are determined. While step 508 (determining regular symbols to place into the game interface) is included in the process 500 as occurring after step 506 (determining block(s) of symbols, if any, to be placed into symbol positions of the game interface), in other embodiments the order of these steps may be reversed or they may occur in parallel. Further, the order in which block(s) of symbol(s) vs. regular symbols are determined may differ from the order in which the block(s) of symbol(s) vs. regular symbols are placed into the game interface as visible to the player. For example, even though in one embodiment a block of symbol(s) to place into the game interface may be determined prior to the regular symbols for a given game instance, the regular symbols may be placed into the game interface first, followed by a movement of the block of symbol(s) into the game interface.

In accordance with some embodiments in which at least one block of symbols is placed into a game interface prior to the regular symbols, step 508 may comprise determining regular symbols only for the symbol positions which are not already populated by (or designated for population by) the symbol(s) within a block of symbol(s), which may require determining which symbol positions are to be populated with regular symbols and determining the regular symbols for these positions. In some embodiments, the regular symbols for all symbol positions may have previously been determined and step 508 may comprise determining which of these regular symbols are to be utilized for the current spin (e.g., by only selecting the regular symbols needed to populate the symbol positions not already populated by, or designated for population by, the symbol(s) within a block of symbol(s)). Such a determination may comprise, for example, utilizing an RNG or algorithm which determines such symbols on a random or pseudo-random basis.

In accordance with one embodiment, once the blocks of symbols are placed within the symbol matrix or other game interface (e.g., are shown to rise up or drop down into the reels, the latter being illustrated in FIG. 6B), the remaining symbol positions may initially be shown as empty, ready to be populated with regular symbols comprising an outcome of the spin. Such an embodiment may be appealing in that it allows for a particular visual presentation of the regular symbols. For example, the regular symbols determined for the remaining symbol positions may be shown as dropping onto the reels from above (e.g., in a cascade motion) and coming to rest on top of the block(s) of symbols which rose up into the reels. Such a visual representation is illustrated below in FIG. 6C, which illustrates a snapshot in time of the game interface of FIG. 6B above once the regular symbols have been added to the symbol matrix.

Of course, any mechanism or visual representation for adding the regular symbols into the remaining symbol positions may be utilized and the embodiments described herein are not dependent upon any particular methodology, order or visual depiction of populating the symbol matrix with regular symbols. For example, in one embodiment the regular symbols may be output at virtually the same time as the block(s) of symbol(s) are output (e.g., the reels may be shown to stop such that the block(s) of symbol(s) and regular symbols are shown in their respective symbol positions at the same time).

In some embodiments, the feature which causes a block of symbol(s) to be moved into a game interface may be a secondary or bonus feature which is triggered upon an occurrence of a predetermined condition (e.g., a predetermined condition that one or more outcomes of the primary game must satisfy). For example, in one embodiment, a bonus block is triggered whenever an outcome of the primary game includes a wild symbol or some other pre-designated symbol which functions to cause a block of symbols to be moved into the game interface. In another example, an output of a block of symbol(s) may be triggered if a player obtains a predetermined number of consecutive losing outcomes in the game. Irrespective of what condition of the primary game causes a block of symbol(s) to be output as a bonus feature, in such embodiments the paylines of the primary game may first be evaluated for winning outcomes and any corresponding payouts may be provided to the player, prior to the block(s) of symbol(s) being placed in the game interface. For example, in one embodiment a block of symbol(s) replaces one or more regular symbols on one or more reels of a slot machine and the paylines of the primary game may be evaluated to determine whether the player has won any payouts as a result of the primary game before any replacement of the regular symbols by one or more blocks of symbol(s).

In step 510, which occurs after at least one block of symbol(s) have been placed into the game interface, it is determined whether the outcome of the spin (i.e., the block(s) of symbol(s) and the regular symbols placed into the symbol matrix as the outcome of the reel spin) include any winning outcomes. As described above, in embodiments in which block(s) of symbol(s) are placed into a game interface as a bonus feature and after payouts for the primary game have been provided, step 510 may be performed after the payouts (if any) for the primary game are provided and the block(s) of symbol(s) are moved into the game interface. It should be noted that when the present description refers to moving a block of symbol(s) into a game interface, placing a block of symbol(s) in a game interface or populating one or more symbol positions of a game interface with a block of symbol(s), this refers to either the entire block of symbol(s) being moved into or placed into the game interface, or any portion thereof being so placed or moved.

If it is determined, in step 510, that at least one winning outcome is present after the at least one block of symbol(s) is placed in the game interface, the appropriate corresponding payout(s) are provided to the player (e.g., the appropriate number of credits are added to a credit meter balance of the player associated with the game instance). A message may also be output to a player of the game, informing him/her of the total payout won.

FIG. 6D illustrates the game interface 600D, which is the game interface 600C of FIG. 6C (including the same symbols in the same symbol positions) but with winning outcomes along two payline highlighted to show which symbols are part of a winning outcome. In particular, and assuming 4 "A" symbols comprise a first winning combination of symbols and 5 "E" symbols comprise a second winning combination of symbols (as indicated in the example payout table illustrated in FIG. 4, which may be utilized by the game illustrated in FIGS. 6A-6L), the game interface 600D indicates that there is a winning combination of symbols along a first payline which includes a winning outcome of the payline consisting of A-W-A-W (in which the W symbols function as A symbols) and a winning combination of symbols along a second payline which includes the winning outcome of the payline consisting of E-W-W-W-W (in which the W symbols function as E symbols).

In accordance with one embodiment, the process 500 is for a game which includes a cascading reel feature in addition to the block(s) of symbol(s) feature. In the particular implementation of a cascade feature utilized in process 500, any regular symbols which are part of a winning outcome of a payline are removed from the symbol matrix in step 512 (of course, in other embodiments other qualifying conditions may cause a regular symbol to be removed from the symbol matrix). In accordance with some embodiments, symbols comprising block(s) of symbol(s) remain intact and are not removed or repositioned within the symbol matrix during the cascade (or at least not during a first cascade; in some embodiments a block of symbol(s) may be gradually removed from the symbol matrix over any subsequent cascades, as described elsewhere herein). In accordance with some embodiments, step 512 (or another step of process 500) further comprises repositioning some symbols within the symbol matrix based on a removal of the regular symbols which were part of a winning combination (e.g., by moving symbols which were above the removed symbols down into the symbol positions vacated by the removed symbols).

FIG. 6E illustrates, in accordance with one embodiment, the regular symbols which were part of the two winning outcomes of the paylines in FIG. 6D as having been removed from the symbol matrix. In accordance with one embodiment, FIG. 6E further shows that any regular symbol which was above a regular symbol removed from the symbol matrix is repositioned ("drops down") into the symbol position previously occupied by the removed regular symbol. Thus, for example, the symbol "E" in position 2 of the first reel is shown as having been removed (because it was part of a winning outcome, as illustrated by the highlighting in Figure D) and the symbol "B" which until then had occupied position 1 of the first reel is shown as being repositioned down such that it will now occupy position 2 of the first reel. Any regular symbol which was above the regular symbol being repositioned down is also repositioned down to occupy the symbol position vacated by the symbol which had been moved down to replace the removed symbol, and so on. Thus, the symbol "C" which had occupied position 2 in the third reel is moved down into position 3, to replace the symbol "E" which had been removed; additionally, the other symbol "C" which had occupied position 1 of the third reel in FIG. 6D is moved down to occupy position 2 vacated by the symbol "C" which had been moved down to position 3.

FIG. 6F illustrates the placement of the symbols after the removal of the symbols which were part of winning outcomes of paylines (as illustrated in FIG. 6D) and repositioning due to the cascade which is illustrated in FIG. 6E.

In step 514, additional regular symbols are determined, for populating the symbol positions which are now unoccupied due to the removal and repositioning resulting from the cascade. FIG. 6G illustrates additional regular symbols being moved into the symbol matrix of FIG. 6F and FIG. 6H illustrates the resultant symbols of the symbol matrix, which comprise a new outcome generated due to the cascade feature. It should be noted that, consistent with some embodiments, the three block(s) of symbol(s) which had previously been placed into the game interface (as illustrated in FIG. 6C) remain intact and no portion of these is moved out of the game interface as a result of the first cascade. Of course in other embodiments (e.g., such as those illustrated in FIGS. 7A-7J), a block of symbols may be at least partially moved out of a game interface even during a first cascade, re-spin or additional spin following a placement of the block of symbol(s) into the game interface.

In step 516 it is determined whether any additional winning outcomes or winning combinations of symbols were created as a result of the cascade feature (taking into account the symbols comprising the block(s) of symbols, which may in some embodiments remain entirely within the game interface after at least the first cascade). If any additional winning outcomes are identified, the corresponding payout(s) are provided to the player.

In step 518, assuming another cascade is triggered based on the result of the previous cascade (e.g., if at least one winning combination of symbols was created as a result of the previous cascade), symbols are again removed from the symbol interface and the vacated symbol positions are replaced. In accordance with some embodiments, after the first cascade of a spin any block(s) of symbols may be shifted out of the symbol matrix or other game interface (e.g., by one symbol position for each additional cascade) and the symbol positions vacated by the repositioned symbols may be filled by (i) regular symbols from above the removed symbols; or (ii) new regular symbols added to the symbol matrix. In one embodiment, such a gradual removal of any blocks of symbols from the symbol matrix may be independent of a qualifying condition within the game while in other embodiments the removal of the block(s) of symbols may only be initiated if a qualifying condition occurs within the game (e.g., a second cascade is triggered if at least one new winning outcome is generated due to the first cascade). In some embodiments, the block(s) of symbols may continue to be stepped out of the game interface by one symbol position for each cascade until there are no further cascades triggered (e.g., no new winning combination is created as a result of a previous cascade, thus no new additional cascade is triggered, in accordance with some cascade feature embodiments). Any regular symbols which were part of a winning combination as a result of the previous cascade are also removed and replaced (e.g., by shifting the symbols above the removed symbols down into the vacated symbol positions).

FIG. 6I illustrates one embodiment in which, as a result of a cascade, all blocks of symbols are shifted out of the symbol matrix illustrated in FIG. 6H by repositioning each block of symbols down by one symbol position (thus effectively removing the bottom-most symbol of each block of symbols from the symbol matrix). The downward movement of the blocks of symbols is illustrated by the arrows 604, 605 and 606 in FIG. 6I (which arrows would likely not be included in a game but are included in interface 600I to indicate the direction of movement for the blocks of symbols).

In accordance with some embodiments, regular symbols are repositioned within the symbol matrix (e.g., symbols above are dropped down into the vacated symbol positions) and added to the symbol matrix, as appropriate, once regular symbols are removed and the blocks of symbol(s) are moved out of the symbol matrix by one position. FIGS. 6J and 6K illustrate regular symbols being rearranged to fill the vacated symbol positions illustrated in FIG. 6I, and new regular symbols being added to populate the symbol positions which do not have regular symbols above them to be repositioned.

In step 520, in accordance with some embodiments, once the blocks of symbols are repositioned by one symbol position (e.g., moved down by one symbol position), regular symbols which were part of winning combinations are removed and regular symbols are repositioned or added to fill the vacated symbol positions, the paylines (or active paylines, in some embodiments) may be re-evaluated once again and any payouts for newly created winning outcomes may be provided to the player. In step 522 it is determined whether an ending condition has occurred (e.g., another cascade has not been triggered). If it has, the process ends. Otherwise, the process 500 returns to step 518 and the blocks of symbols are moved further out of the symbol matrix by one more symbol position, regular symbols which were part of winning combinations are removed from the symbol matrix and repositioning or adding regular symbols to fill newly vacated symbol positions is repeated.

In some embodiments, steps 518-520 are repeated until an ending condition occurs. Examples of ending conditions include (i) determining that there are no more winning outcomes created due to the repositioning and adding of symbols; and (ii) determining that all bonus blocks have fully been removed from the game interface.

Of course, the process 500 or other processes described herein may be modified without departing from the spirit and scope of the invention(s) described herein. For example, the process of beginning to gradually remove the block(s) of symbol(s) out of the game interface (e.g., as illustrated in FIG. 6I) may, in some embodiments, be implemented right after an evaluation of paylines (or active paylines) once the outcome of the spin is initially resolved (e.g., right after step 510 of process 500, which is illustrated in FIG. 6D). Thus, for example, once the paylines are initially evaluated for winning combinations in step 510 (whether a distinct cascade feature is utilized within the game or not), the block(s) of symbols may be shifted out of the game interface by one symbol (e.g., shifted down such that the bottom-most symbol is removed from the game interface) and a re-evaluation of the paylines may be performed after this re-positioning of symbols (which may also involve repositioning regular symbols or adding new regular symbols to the game interface to fill vacated symbol positions, as described with respect to step 514). Such a "stepping out" or gradual shifting of the block(s) of symbols out of the game interface may be repeated (e.g., with a re-evaluation of the paylines for new winning outcomes after each repositioning of the block(s) of symbols and any repositioning or adding of regular symbols to fill vacant symbol positions) until the block(s) of symbols are entirely removed from the symbol matrix or other game interface. In embodiments which also include a distinct cascade feature for the regular symbols (e.g., once paylines are evaluated for winning outcomes, any regular symbols which are part of a winning outcome are removed from the symbol matrix and regular symbols above the removed symbols are shifted down to the vacated symbol position, etc. as described with respect to step 512 of process 500), the gradual shifting out of the block(s) of symbols may be a process incorporated with the cascade feature. For example, the block(s) of symbols may be shifted out of the game interface by one symbol for each cascade of regular symbols.

Not only may the process or game mechanics be modified from those described with respect to process 500, but so may the visual or graphical representations used to depict the block(s) of symbols feature. For example, FIG. 6L illustrates an alternate visual mechanic for introducing one or more blocks of symbols into a game interface. The visual effect of FIG. 6L is that of a fountain which appears to shoot the blocks of symbols up into the reels from the bottom of the game interface, similar to how a fountain shoots up jets of water.

In one embodiment, once it is determined for a spin or session that at least one block of symbol(s) is to be placed into a game interface (e.g., as described with respect to step 504 of process 500), the at least one block of symbol(s) may not be completely populated into the symbol positions of the game interface as part of an outcome of the spin. Rather, the at least one block of symbol(s) may be gradually moved into the game interface (e.g., by one symbol or unit corresponding to one symbol position) over the course of several spins, cascades or other game events. In one embodiment, a block of symbol(s) is placed outside of the visible symbol matrix (e.g., over the reel into which it is supposed to be moved into) and the block of symbol(s) gradually moves down into the reel over the course of one or more spins, cascades or other game events. For example, each time a cascade is triggered by a winning outcome such that the regular symbols comprising the winning outcome are removed from the symbol matrix after a payline evaluation and symbols are repositioned within the symbol matrix such that there is room on the reel for the block of symbol(s) to "drop down" into the reel, the block of symbol(s) is moved down into the reel by the appropriate number of symbols or units corresponding to symbol positions (e.g., based on the number of vacant symbol positions created by the cascade or other game event). In one embodiment, once a block of symbol(s) is completely moved into the symbol matrix or other visible game interface, a bonus mode or other secondary feature of the game may be triggered.

FIGS. 6M-6S illustrate a sequence of events in which (i) a block of symbol(s) is determined for a spin and placed over a reel for which it is intended (FIG. 6M); (ii) paylines are evaluated for winning outcomes (FIG. 6N, in which it is highlighted that there are winning combinations along paylines 601 and 603, with the three respective "C" symbols); (iii) regular symbols which were part of any winning outcomes are removed from the symbol matrix and any regular symbols above the removed symbols are dropped down as low as they can go within the symbol matrix (FIG. 6O); (iv) the block of symbol(s) is moved down into the symbol matrix as far as possible given the vacant symbol positions (FIG. 6P); (v) paylines are re-evaluated for any new winning outcomes created (FIG. 6Q, which shows winning combinations along paylines 605 and 607); (vi) the regular symbols which are part of the additional winning outcomes are removed from the symbol matrix (FIG. 6R); (vii) and the block of symbol(s) is fully dropped down into the symbol matrix now that sufficient symbol positions have been vacated (FIG. 6S).

In accordance with some embodiments, once all of a block of symbol(s) has been placed within the visible (visible to the player) portion of a game interface, a bonus or secondary feature of a game may be triggered. In the embodiment of FIGS. 6M-6S, the symbols comprising the block of symbol(s) do not act as wild symbols or contribute to the creation of winning outcomes (thus the placement of any portion of the block of symbols within the symbol matrix does not create additional winning outcome opportunities and may actually hinder the possibility of winning outcomes along some paylines). In other embodiments, the symbols comprising the block of symbols may act as wild symbols or otherwise contribute to the creation of winning outcomes.

In the embodiment of FIGS. 6M-6S above, the block of symbol(s) is only moved further into the symbol matrix when a cascade feature (or other feature) results in a removal of regular symbols from the symbol matrix from the reel associated with the block of symbol(s). In other embodiments, however, a block of symbol(s) could be "stepped" or gradually moved into a symbol matrix or other game interface via another mechanism. For example, in one embodiment the block of symbols could "force out" regular symbols in its path (i.e., the block of symbols could operate to cause the removal of regular symbols in its path based on one or more conditions or triggers), regardless of whether the regular symbols were removed due to some other feature of the game (FIGS. 7A-7J, described herein, illustrate such an embodiment). As in the embodiment of FIGS. 6M-6S, a bonus or secondary feature of the game could be triggered once the block of symbols was fully placed or visible within the symbol matrix or other game interface.

Referring now to FIGS. 7A-7J, illustrated therein are successive screen shots of a game interface of one embodiment of a game, as it progresses over a course of one spin which triggers a block of symbol(s) to be output as well as a plurality of cascades during which the block of symbol(s) is gradually removed from the game interface. The example game illustrated in FIGS. 7A-7J is one in which (i) an appearance of a wild symbol in an outcome of a spin indicates that a block of symbol(s) is to be output in the game interface; (ii) the block of symbol(s) replaces a plurality of symbols on a single reel (e.g., the reel on which the wild symbol appeared, up from the bottom-most symbol position of the reel and up to the symbol position in which the wild symbol appeared); and (iii) the appearance of the block of symbol(s) and/or the wild symbol also triggers a cascade feature, which cascade feature ends when no further winning combinations of symbols are created as a result of a preceding cascade.

In accordance with some embodiments, a process for determining an outcome for the example game illustrated in FIGS. 7A-7J may include a separate and distinct process or sub-routine for determining whether to include a wild symbol in an outcome of a spin (and thus whether a block of symbol(s) will be placed into the game interface as a result of the spin). Such a separate and distinct process or subroutine may, in some embodiments, be a distinct determination from a determination of a primary outcome of the spin (i.e., the symbols to be placed or payouts to be awarded as a result of the spin aside from the block of outcome(s) and corresponding triggering of a cascade feature). Similarly, such a separate and distinct process may, in some embodiments, be based on an algorithm which is distinct from an algorithm for determining the primary outcome of the game.

Figure 7A:
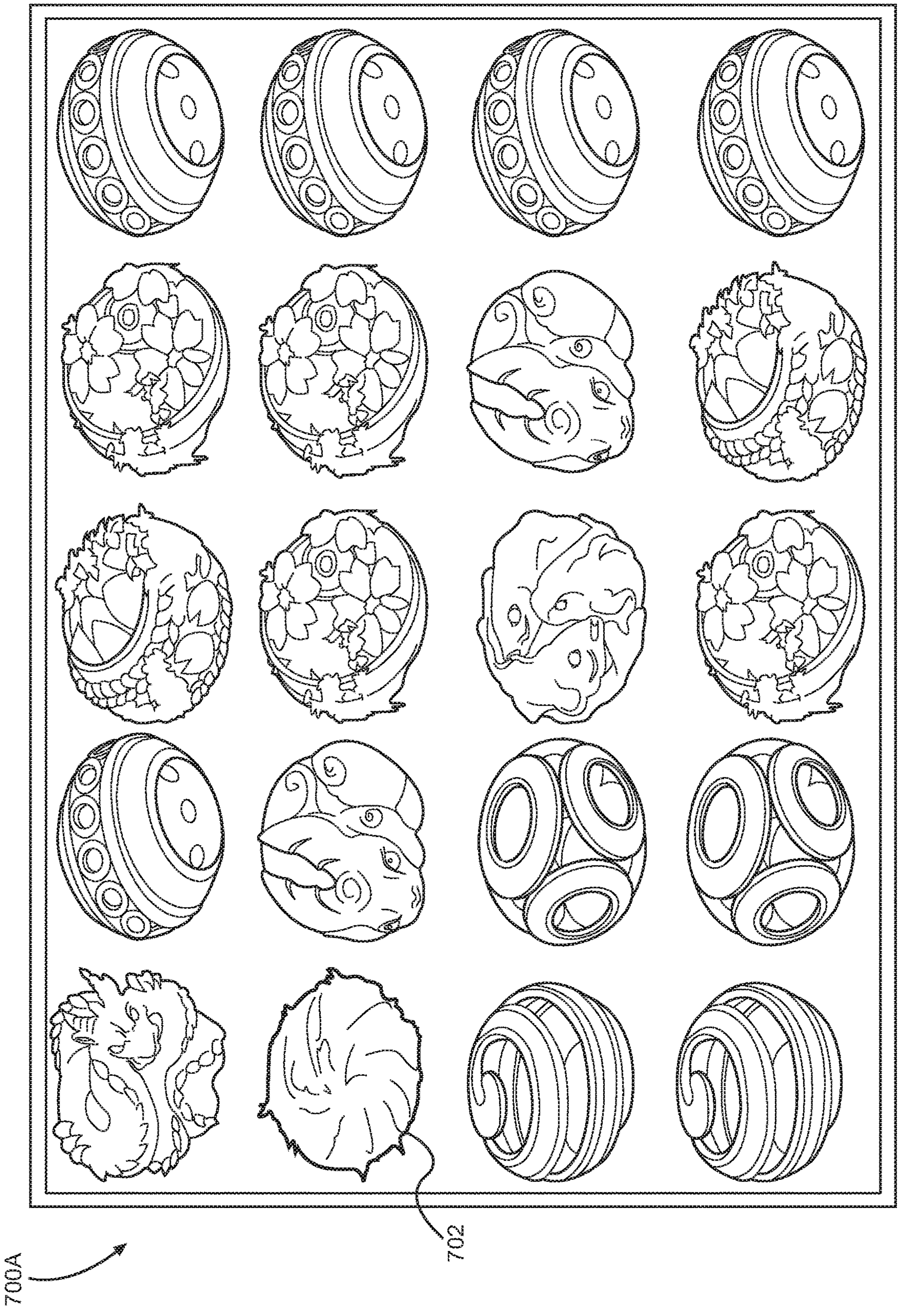
FIGS. 7A-7J comprise screen shots of a game, illustrating progress of a game event which includes manipulation of a block of symbols in accordance with one example embodiment.

Turning now to FIG. 7A, illustrated therein is a game interface 700A, as it may be output to a player at a resolution of a spin, when the reels have stopped spinning and the outcome of the spin is indicated to the player via symbols placed into symbol positions of the game interface. The game interface 700A includes one wild symbol, symbol 702. Thus, in accordance with the rules of the example game illustrated in FIGS. 7A-7J, a block of symbols will next be placed into the game interface.

Figure 7B:
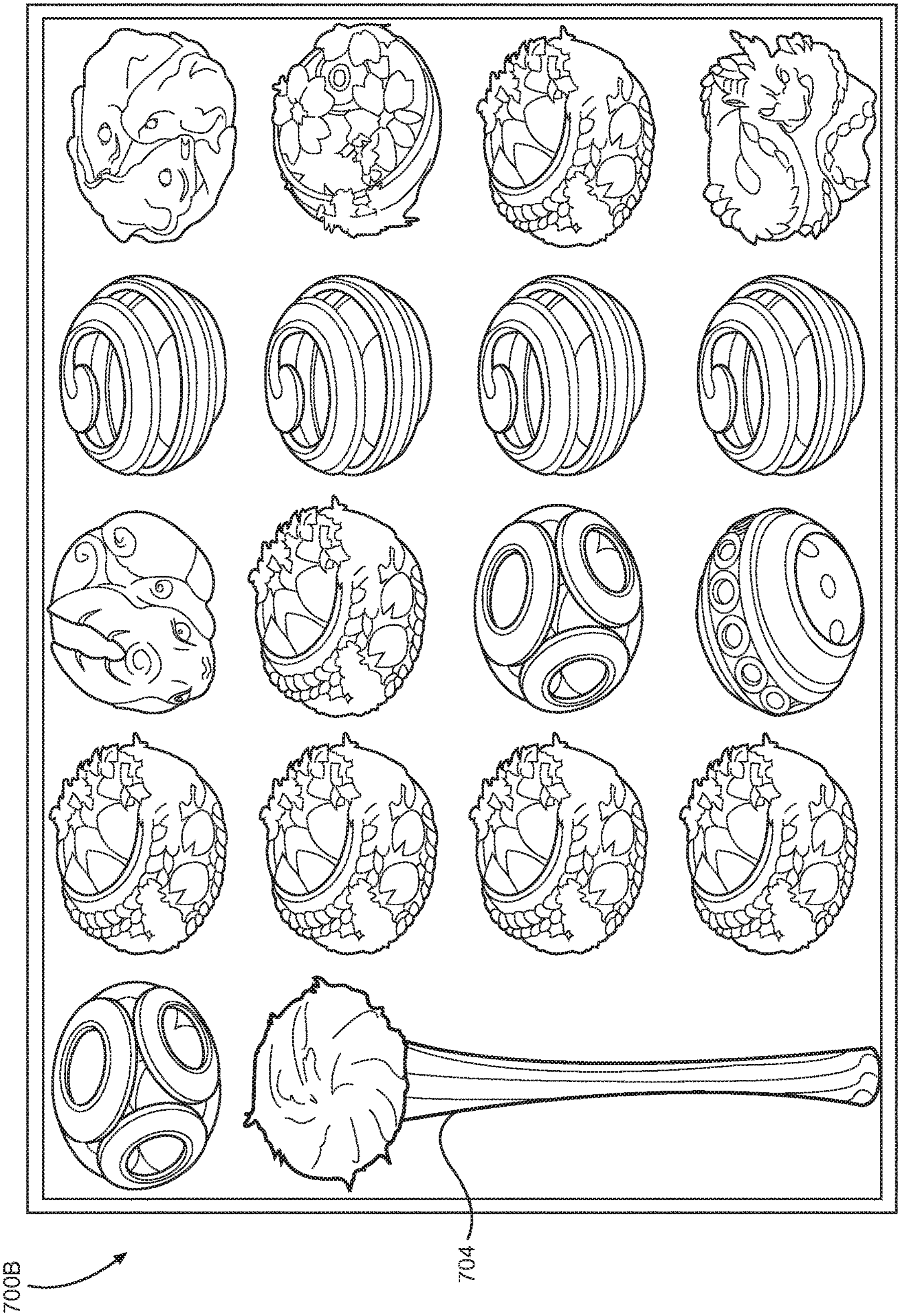

Turning to FIG. 7B, illustrated therein is a game interface 700A, which shows a modification in game symbols and progress in the game since that illustrated in game interface 700A of FIG. 7A. In particular, game interface 700B shows that a block of symbol(s) 704 has been placed into game interface 700B, the block of symbol(s) being placed into symbol positions 1, 2 and 3 of the first reel and replacing any regular symbols that were previously placed in these symbol positions. Consistent with some embodiments, the block of symbol(s) 704 is illustrated as a single symbol which spans a plurality of symbol positions (rather than being illustrated as a plurality of individual symbols that move as a unit). In accordance with some embodiments, even though the block of symbol(s) 704 is illustrated as a single elongated symbol which occupies a plurality of symbol positions, it effectively functions as a plurality of symbols and, in the particular embodiment being illustrated in FIGS. 7A-7J, as an individual wild symbol within each symbol position it occupies.

It should be noted that, in accordance with some embodiments, any payouts which a player may have won as a result of the symbols placed as an initial outcome for the spin (as indicated in game interface 700A, before the block of symbol(s) was placed into the game interface) may first have been provided to the player prior to the block of symbol(s) being placed into the game interface.

It should be noted that in a game, the time between the game interface depictions illustrated in FIGS. 7A-7J may be minute and not readily discernable to a player. For example, the block of symbol(s) 704 of FIG. 7B may appear almost instantly (e.g., a second or less) after the wild symbol 702 appears in the instant of the game interface illustrated in FIG. 7A. In other words, the progress of the game may flow fairly rapidly and the "still shots" of the game interface illustrated in FIGS. 7A-7J may, if allowed to run through without interruption, be completed within a few seconds.

Figure 7C:
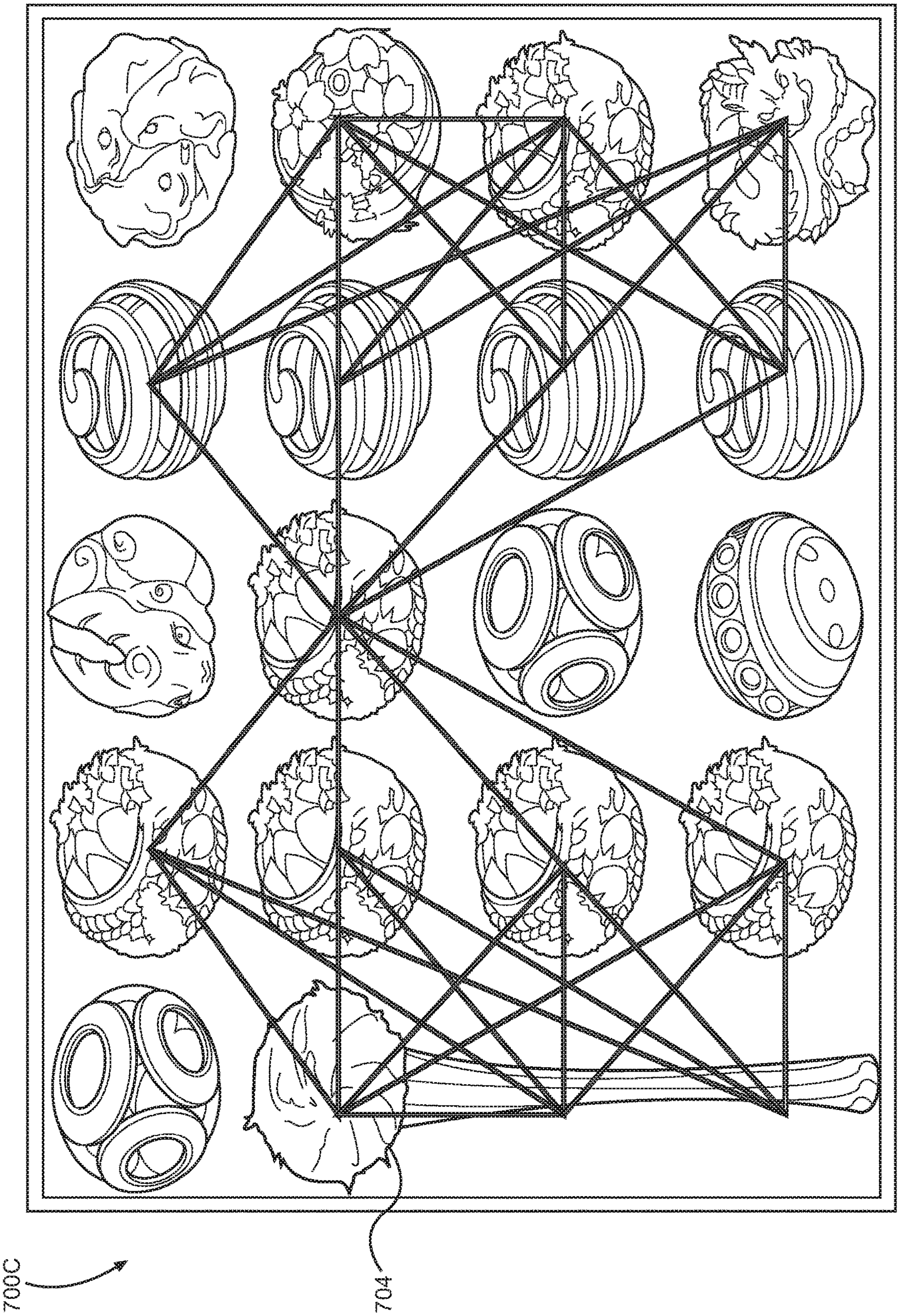

In accordance with some embodiments, once a block of symbol(s) is placed into a game interface, paylines (or, in some embodiments, active paylines) are evaluated to determine whether any new winning combinations of symbols have been created as a result of the placement of the block of symbol(s). FIG. 7C illustrated, in game interface 700C (which illustrates how the game or indications to the player within the game have progressed since that illustrated in FIG. 7B) which includes an indication of each payline which includes a winning combination of symbols. As can be appreciated and as is common with many games, the game includes a large number of paylines (many of which are not linear or do not follow any discernable pattern or shape).

In accordance with some embodiments, if there is at least one winning combination of symbols which is created as a result of the block of symbol(s) 704 being added to the game interface (and, in the embodiment of FIG. 7C, there are several such winning combinations) a cascade feature is triggered. In one example embodiment of a cascade feature, once the payouts for the winning combinations along the paylines are provided to the player, the regular symbols which are part of winning combinations of symbols (or the qualifying symbols) may be removed from the game interface. In accordance with one embodiment, a portion of the block of symbol(s) 704 may also be "stepped-out" of the game interface or otherwise removed from the game interface such that it occupies fewer symbol positions than it did prior to the cascade. For example, the bottom-most portion, which occupies the bottom-most symbol position, may be removed if the block of symbol(s) was moved in an upward motion from the bottom of the game interface and is removed in a downward motion towards the bottom of the game interface. Of course, in other embodiments the block of symbol(s) may be moved into or moved out of the game interface in different directions and the embodiments described herein are not dependent on any particular direction of motion of the block of symbol(s).

Figure 7D:
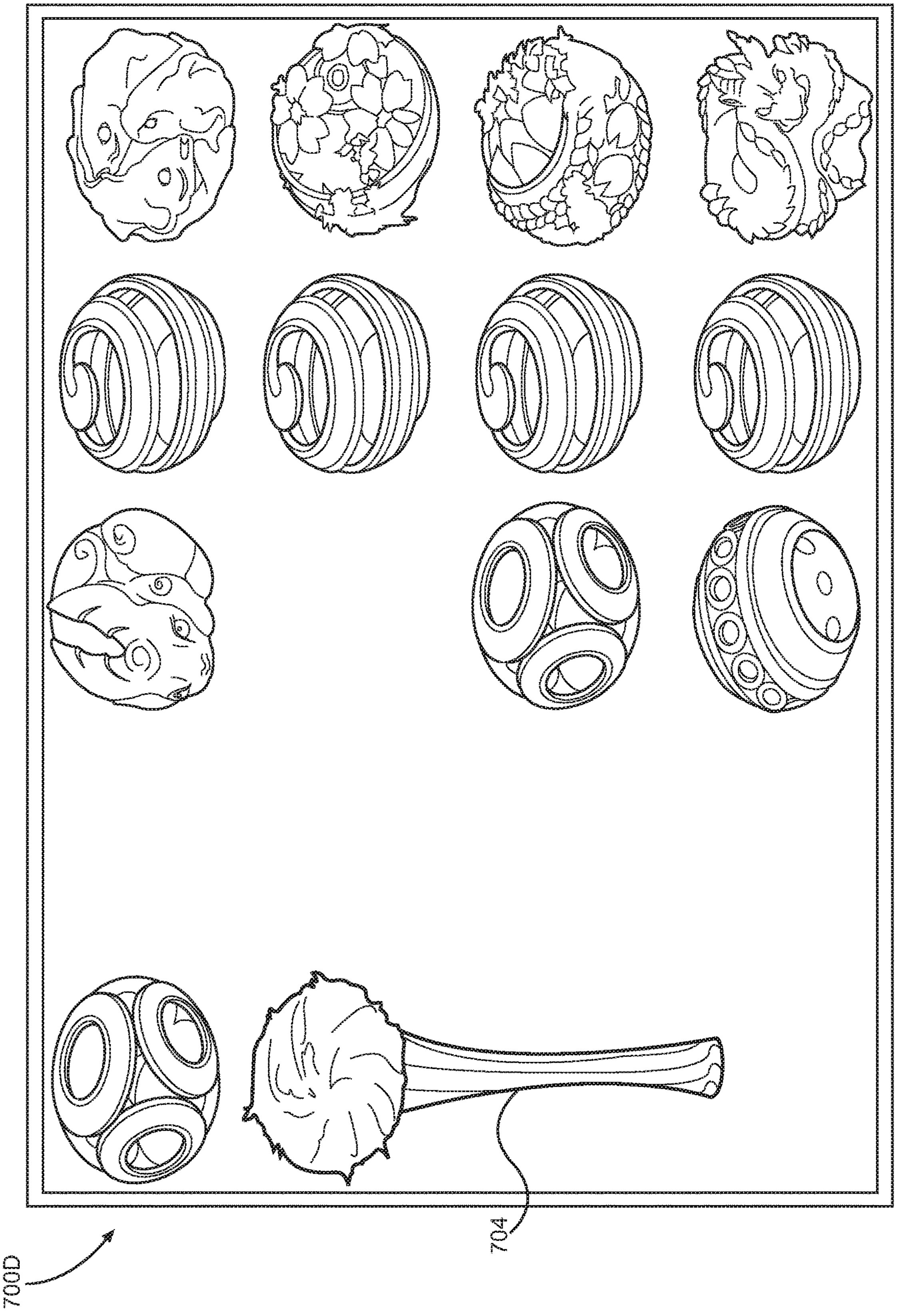
Figure 7E:
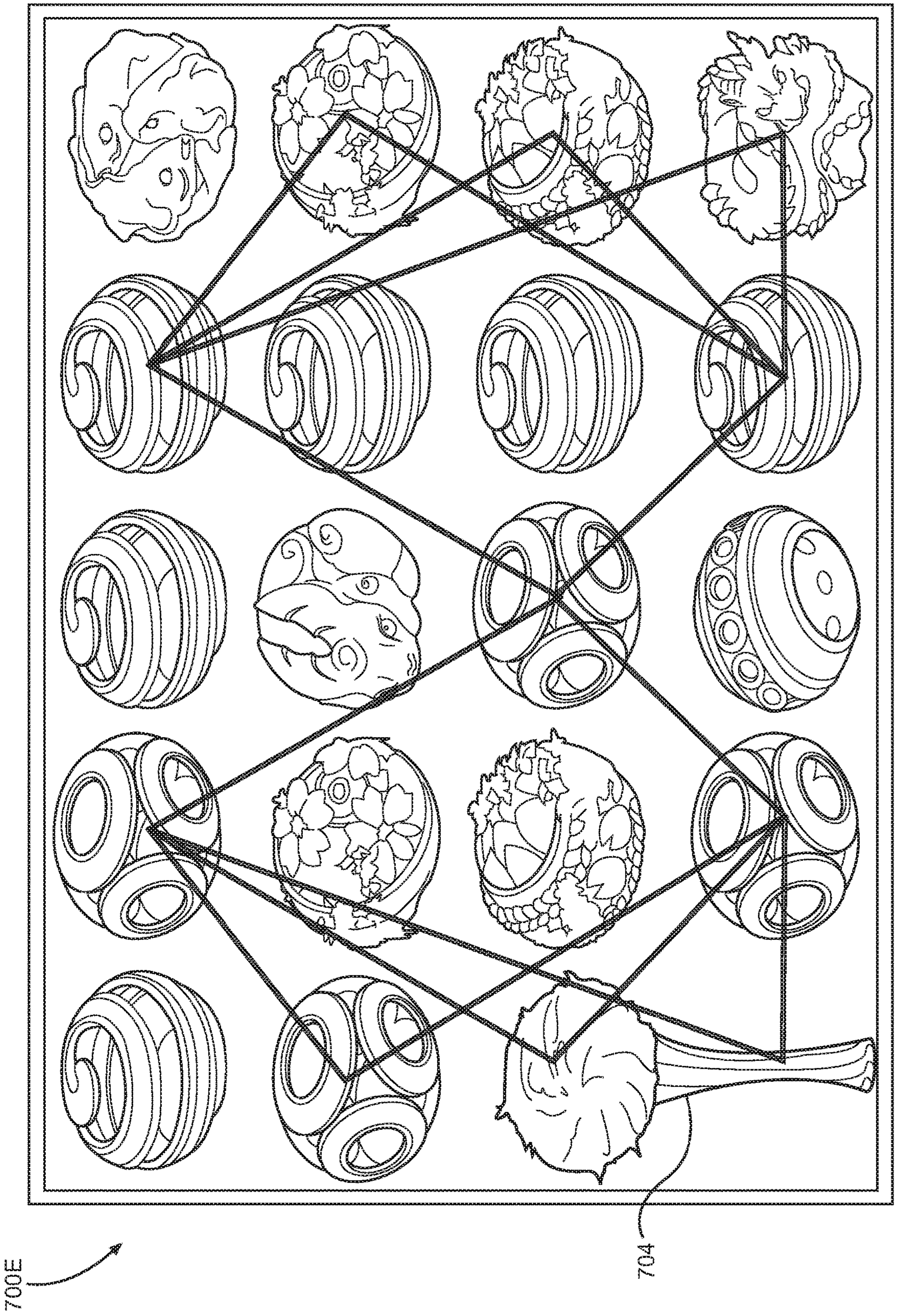

FIG. 7D illustrates the game interface 700D, at a time after the symbols which were qualifying symbols along the paylines illustrated in FIG. 7C and the bottom-most portion of the block of symbol(s) 704 have been removed. Then, in accordance with some embodiments, the vacated symbol positions are filled via a cascade (i.e., symbols which were placed above the vacated symbol positions drop down to fill the vacated symbol positions). FIG. 7E illustrates in game interface 700E which includes the replacement symbols which have dropped down or have otherwise been placed into the vacated symbol positions shown in FIG. 7D. In accordance with some embodiments, the block of symbol(s) 704 has been moved down in the game interface 700E such that it only takes up symbol positions 2 and 3 of the first reel, such that symbol position 1 has been vacated and filled with the symbol which had previously been in symbol position 0 of the first reel (as shown in FIG. 7D). FIG. 7E further illustrates the paylines which now include new winning combinations as a result of the filling of the vacated symbol positions.

In accordance with some embodiments, any payouts due to the player as a result of the winning combinations of symbols along the paylines illustrated in FIG. 7E are provided to the player and another cascade is initiated (in some embodiments, if no additional winning combinations of symbols had been created as a result of the preceding cascade, the cascade feature would now end). Thus, the qualifying symbols along the paylines are removed and the block of symbol(s) is also further removed from the game interface (e.g., by removing the bottom-most portion).

Figure 7F:
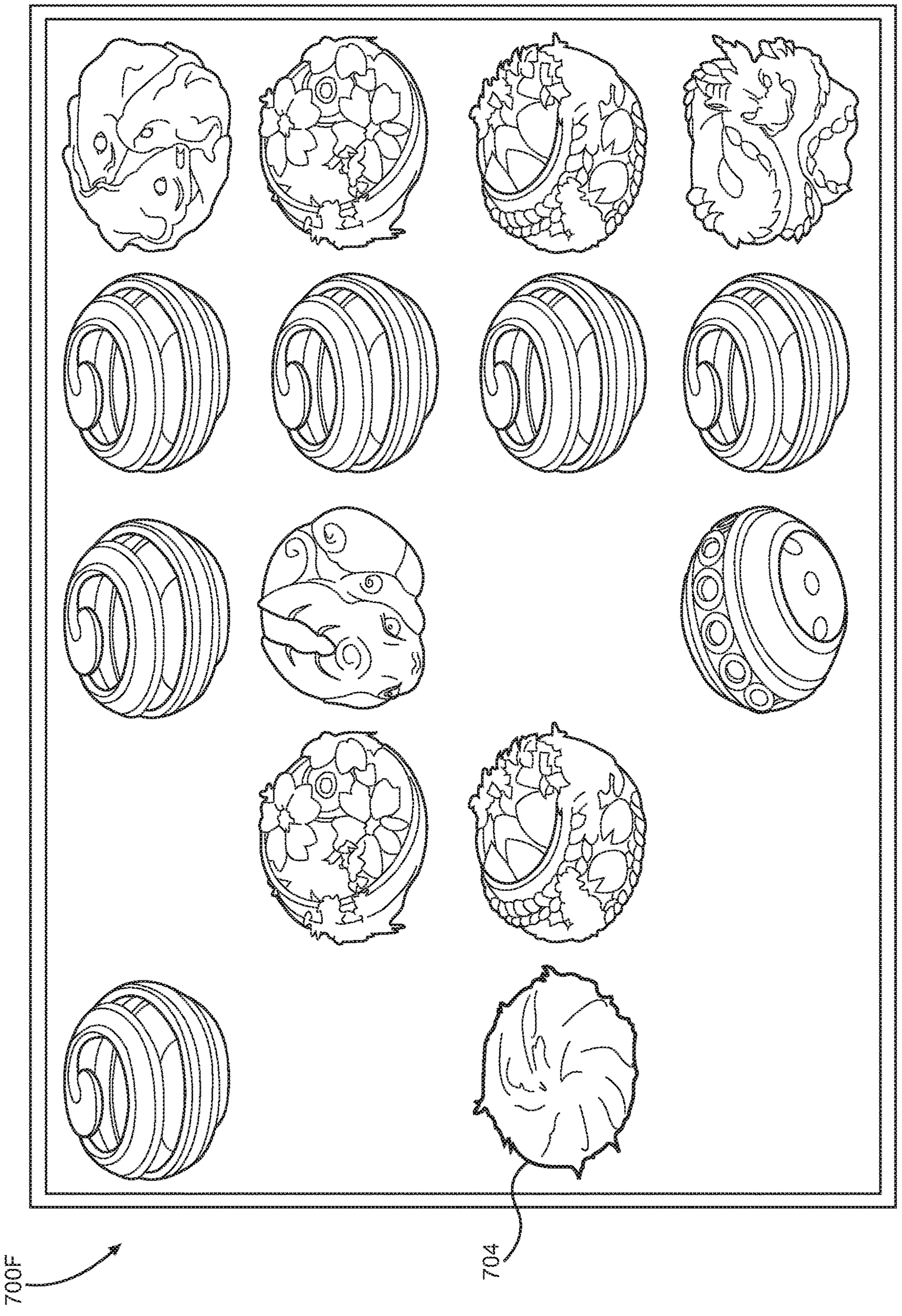
Figure 7G:
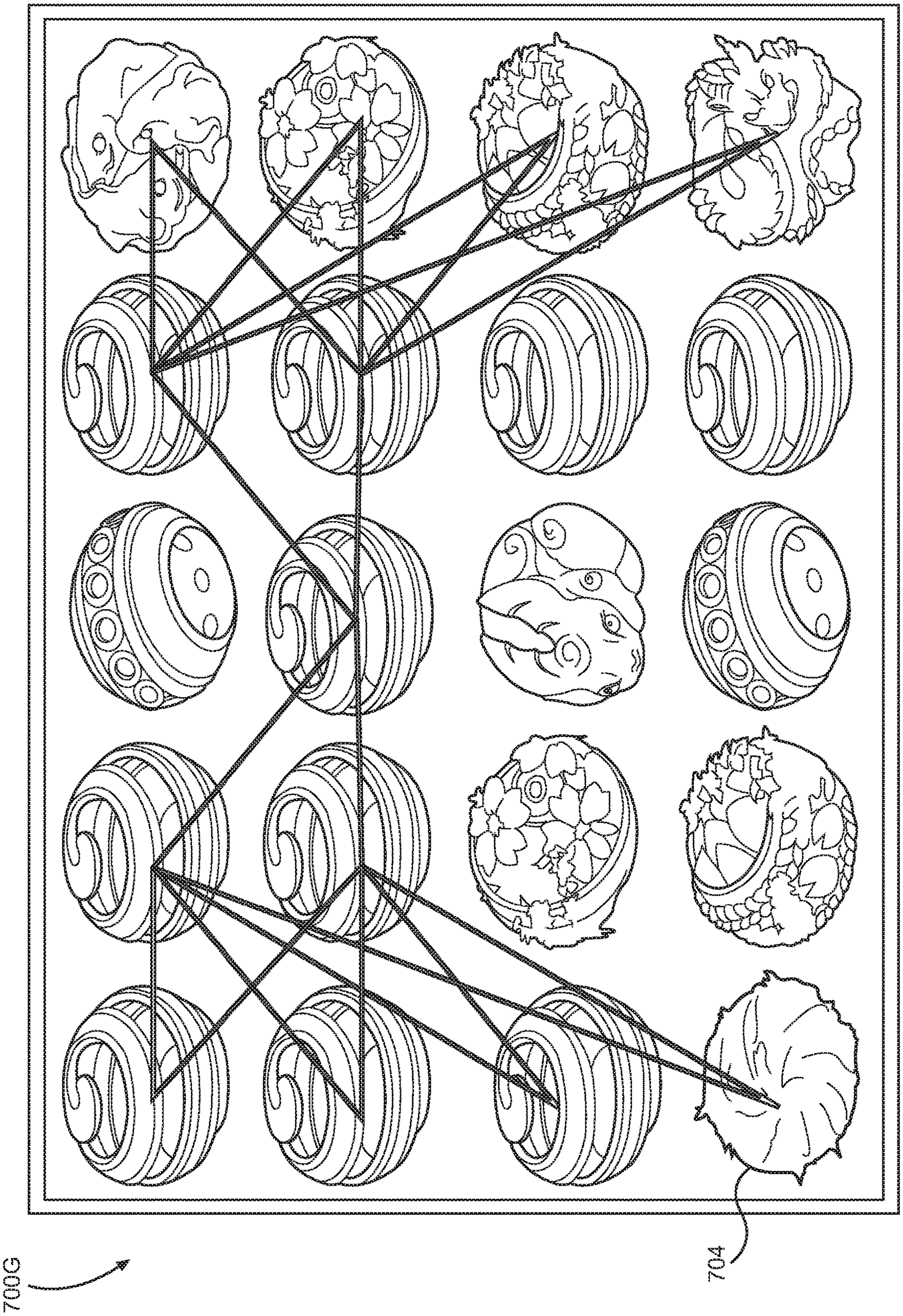

FIG. 7F illustrates the game interface 700F, at a time after the symbols which were qualifying symbols along the paylines illustrated in FIG. 7E and the bottom-most portion of the block of symbol(s) 704 have been removed. Then, in accordance with some embodiments, the vacated symbol positions are filled via a cascade (i.e., symbols which were placed above the vacated symbol positions drop down to fill the vacated symbol positions). FIG. 7G illustrates in game interface 700G which includes the replacement symbols which have dropped down or have otherwise been placed into the vacated symbol positions shown in FIG. 7F. In accordance with some embodiments, the block of symbol(s) 704 has been moved down in the game interface 700G such that it only takes up symbol position 3 of the first reel, such that symbol position 2 has been vacated and filled with the symbol which had previously been in symbol position 0 of the first reel. As shown in FIG. 7F, the symbol in symbol position 1 is a qualifying symbol and has thus also been removed from the game interface, thus allowing the symbol in symbol position 0 to drop down two symbol positions to symbol position 2 and leaving symbol positions 0 and 1 to be filled in with symbols which, in accordance with some embodiments, were previously out of view but queued up for the first reel or with symbols which are determined dynamically for these symbol positions). FIG. 7G further illustrates the paylines which now include new winning combinations as a result of the filling of the vacated symbol positions. Once again, since new winning combinations of symbols were created as a result of the preceding cascade, a new cascade is initiated.

Figure 7H:
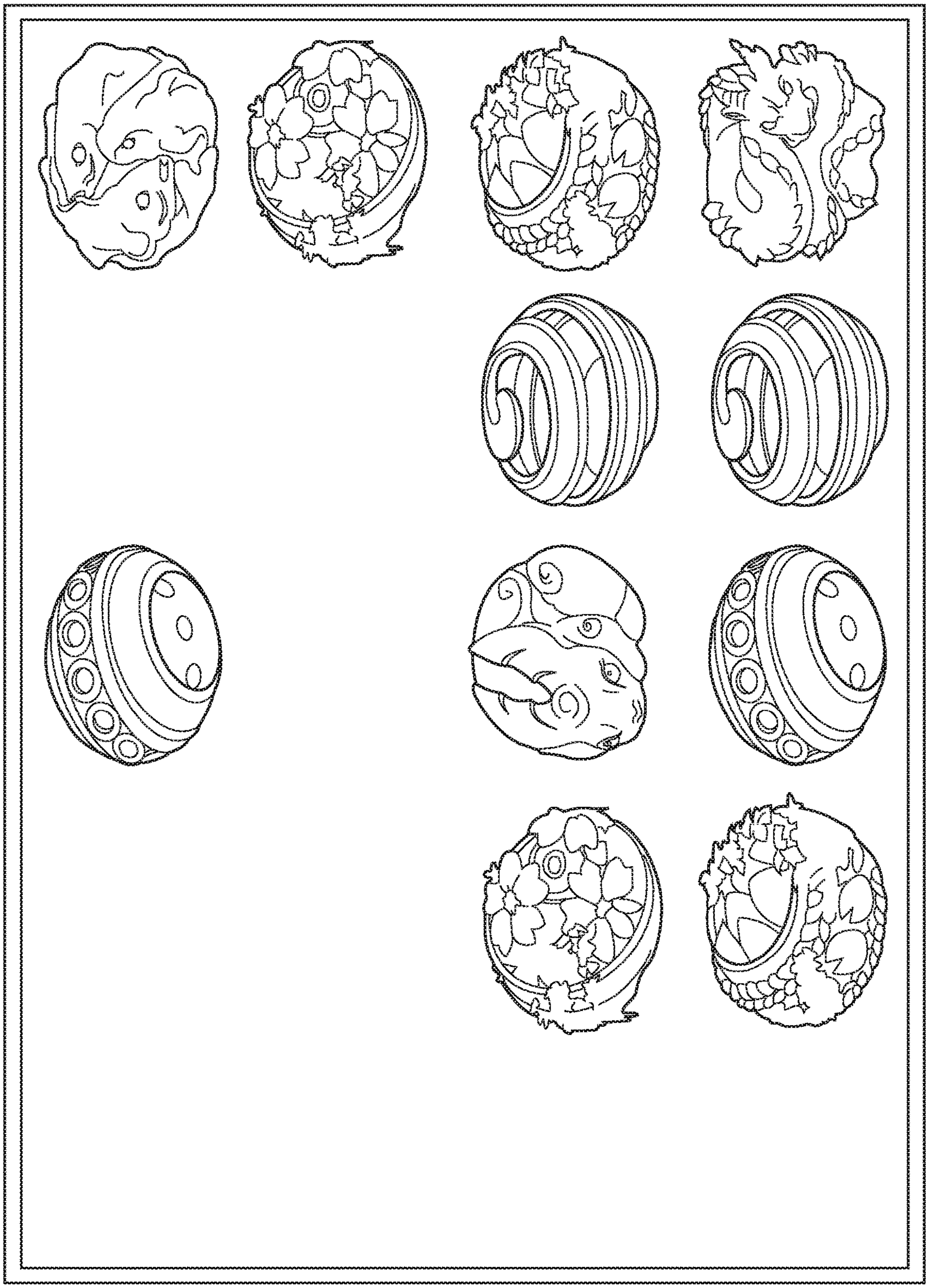

Turning now to FIG. 7H, illustrated therein is game interface 700H, which shows progress in the game since that shown in game interface 700G. In particular, game interface 700H illustrates that each of the qualifying symbols along the paylines illustrated in FIG. 7G have been removed and that the last remaining portion of the block of symbol(s) 704 has been removed from the game interface as well. As described before and in accordance with some embodiments, any payouts due to the player as a result of the winning combinations along the paylines illustrated in FIG. 7G may be provided to the player prior to the removal of symbols and initiation of an additional cascade.

Figure 7I:
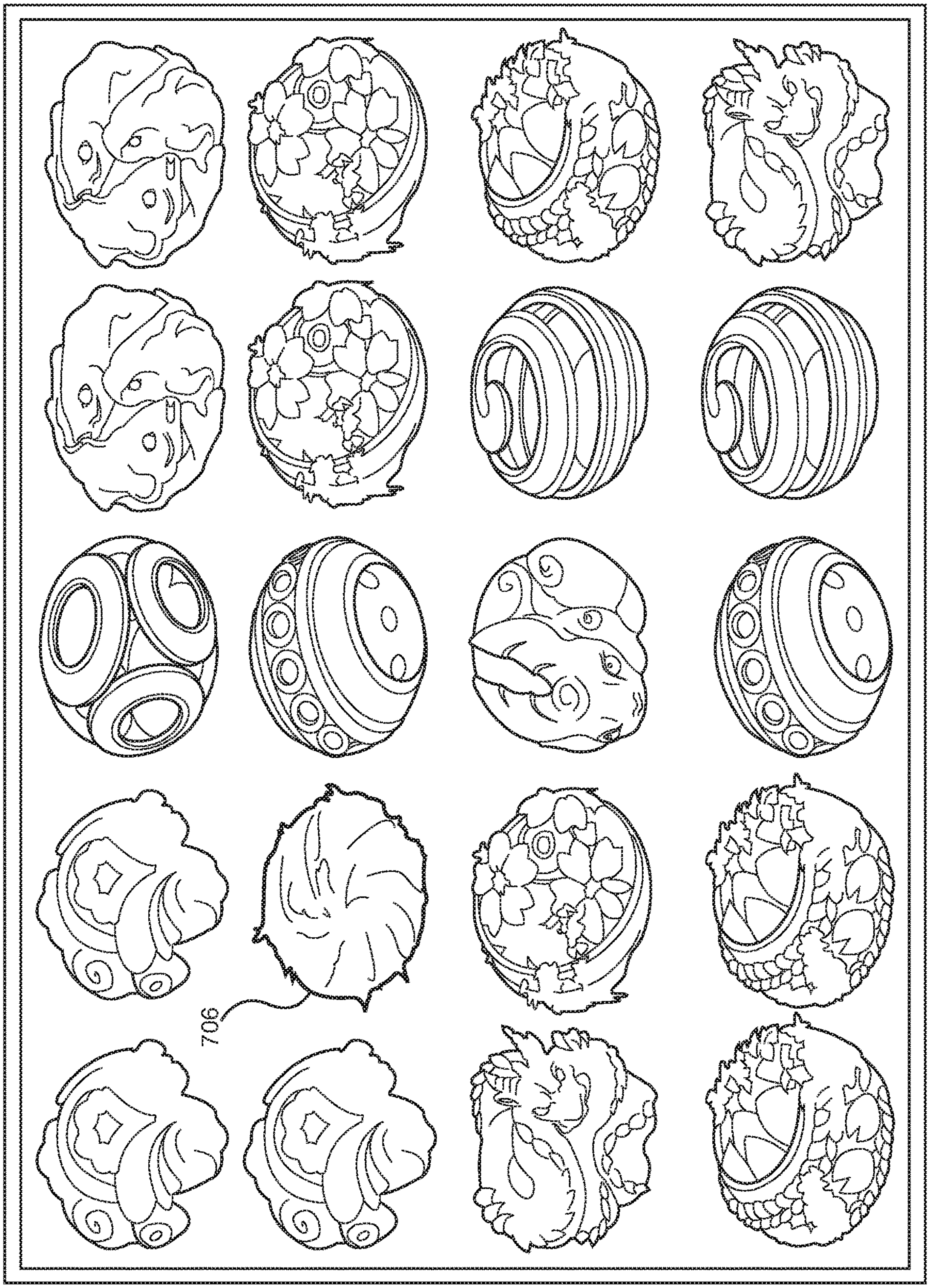

FIG. 7I illustrates the game interface with vacated symbol positions of FIG. 7H filled via a cascade, which includes the replacement symbols which have dropped down or have otherwise been placed into the vacated symbol positions shown in FIG. 7H. In accordance with some embodiments, the block of symbol(s) 704 has been completely removed from the game interface.

Figure 7J:
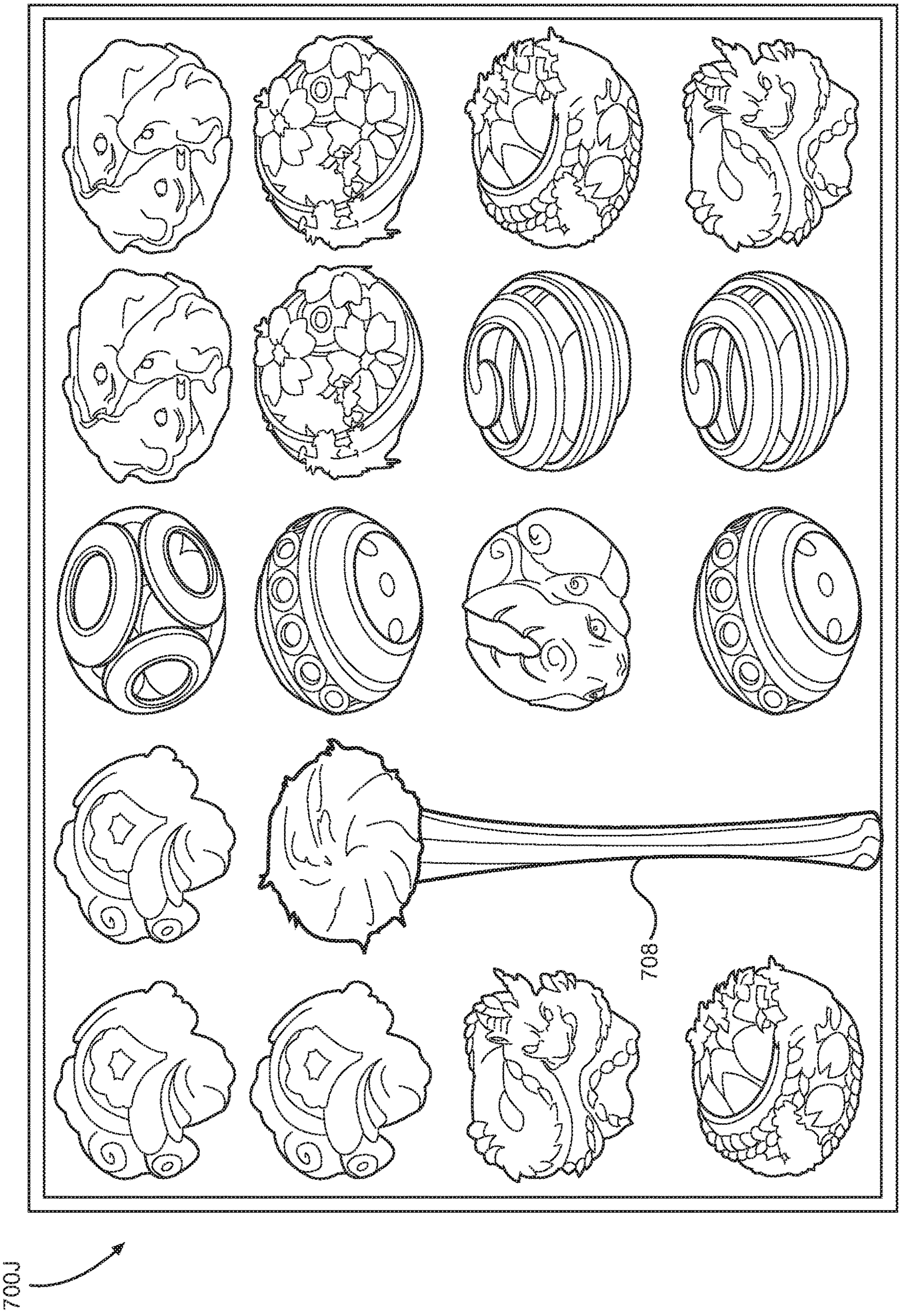

FIG. 7I further illustrates, via the lack of paylines along the game interface, that no new winning combinations have been created as a result of the filling of the vacated symbol positions. However, another wild symbol 706 has been moved into the game interface as a result of the preceding cascade. Thus, in accordance with some embodiments, a new block of symbol(s) is moved into the game interface based on the placement of the game interface. FIG. 7J illustrates the placement of a new block of symbol(s) 708 into the game interface. In accordance with some embodiments, paylines may at this point in the game be again re-evaluated to determine whether any new winning combinations have been created as a result of the placement of the new block of symbol(s) 706 and, if any have been so created, the corresponding payout(s) may be provided to the player and a cascade feature again initiated, similar to that described with respect to FIGS. 7C-7I.

In accordance with some embodiments, a cascade feature may continue until a stop condition occurs. In one example embodiment, a stop condition may comprise a result of a preceding cascade in which (i) no additional new winning combinations are created as a result of the cascade; and (ii) no wild symbol is placed into the game interface, thus not causing a new block of symbol(s) to be added to the game interface.

The embodiments described herein provide various advantages over other game features currently available. For example, a block of symbol(s) which is gradually stepped or placed into or out of a symbol matrix or other interface, evaluated, and cascaded or repositioned until all of the symbols comprising the block of symbols are out of view makes a spin or game event may result in a more enjoyable experience for some players and prolong the anticipation of a final result of a spin. In some embodiments, having a block of symbols placed, staged or "waiting" outside a visible symbol matrix or other game interface and then gradually shifted into the symbol matrix over a plurality of cascades or other game events, eventually triggering a bonus or secondary feature once it comes fully into view, is also an exciting new feature for a game. Generating blocks of symbols, in at least some embodiments, as a separate and distinct process (e.g., based on a distinct algorithm) from the determination of the regular symbols for an outcome also allows for greater mathematical flexibility in determining outcomes and prizes.

Rules of Interpretation

Numerous embodiments are described in this disclosure, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments nor a listing of features of the invention that must be present in all embodiments.

The Title (set forth at the beginning of the first page of this disclosure) is not to be taken as limiting in any way as the scope of the disclosed invention(s).

The term "product" means any machine, manufacture and/or composition of matter as contemplated by 35 U.S.C. § 101, unless expressly specified otherwise.

The terms "an embodiment", "embodiment", "embodiments", "the embodiment", "the embodiments", "one or more embodiments", "some embodiments", "one embodiment" and the like mean "one or more (but not all) disclosed embodiments", unless expressly specified otherwise.

The terms "the invention" and "the present invention" and the like mean "one or more embodiments of the present invention."

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "and/or", when such term is used to modify a list of things or possibilities (such as an enumerated list of possibilities) means that any combination of one or more of the things or possibilities is intended, such that while in some embodiments any single one of the things or possibilities may be sufficient in other embodiments two or more (or even each of) the things or possibilities in the list may be preferred, unless expressly specified otherwise. Thus for example, a list of "a, b and/or c" means that any of the following interpretations would be appropriate: (i) each of "a", "b" and "c"; (ii) "a" and "b"; (iii) "a" and "c"; (iv) "b" and "c"; (v) only "a"; (vi) only "b"; and (vii) only "c."

The term "plurality" means "two or more", unless expressly specified otherwise.

The term "herein" means "in the present disclosure, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase at least one of a widget, a car and a wheel means either (i) a widget, (ii) a car, (iii) a wheel, (iv) a widget and a car, (v) a widget and a wheel, (vi) a car and a wheel, or (vii) a widget, a car and a wheel.

The phrase "based on" does not mean "based only on", unless expressly specified otherwise. In other words, the phrase "based on" describes both "based only on" and "based at least on".

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device, component or article is described herein, more than one device, component or article (whether or not they cooperate) may alternatively be used in place of the single device, component or article that is described. Accordingly, the functionality that is described as being possessed by a device may alternatively be possessed by more than one device, component or article (whether or not they cooperate).

Similarly, where more than one device, component or article is described herein (whether or not they cooperate), a single device, component or article may alternatively be used in place of the more than one device, component or article that is described. For example, a plurality of computer-based devices may be substituted with a single computer-based device. Accordingly, the various functionality that is described as being possessed by more than one device, component or article may alternatively be possessed by a single device, component or article.

The functionality and/or the features of a single device that is described may be alternatively embodied by one or more other devices that are described but are not explicitly described as having such functionality and/or features. Thus, other embodiments need not include the described device itself, but rather can include the one or more other devices which would, in those other embodiments, have such functionality/features.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not indicate that all or even any of the steps are essential or required. Various other embodiments within the scope of the described invention(s) include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise.

Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

Headings of sections provided in this disclosure are for convenience only, and are not to be taken as limiting the disclosure in any way.

"Determining" something can be performed in a variety of manners and therefore the term "determining" (and like terms) includes calculating, computing, deriving, looking up (e.g., in a table, database or data structure), ascertaining, recognizing, and the like.

A "display" as that term is used herein is an area that conveys information to a viewer. The information may be dynamic, in which case, an LCD, LED, CRT, Digital Light Processing (DLP), rear projection, front projection, or the like may be used to form the display. The aspect ratio of the display may be 4:3, 16:9, or the like. Furthermore, the resolution of the display may be any appropriate resolution such as 480i, 480p, 720p, 1080i, 1080p or the like. The format of information sent to the display may be any appropriate format such as Standard Definition Television (SDTV), Enhanced Definition TV (EDTV), High Definition TV (HDTV), or the like. The information may likewise be static, in which case, painted glass may be used to form the display. Note that static information may be presented on a display capable of displaying dynamic information if desired. Some displays may be interactive and may include touch screen features or associated keypads as is well understood.

The present disclosure may refer to a "control system" or program. A control system or program, as that term is used herein, may be a computer processor coupled with an operating system, device drivers, and appropriate programs (collectively "software") with instructions to provide the functionality described for the control system. The software is stored in an associated memory device (sometimes referred to as a computer readable medium or an article of manufacture, which may be non-transitory in nature). While it is contemplated that an appropriately programmed general purpose computer or computing device may be used, it is also contemplated that hard-wired circuitry or custom hardware (e.g., an application specific integrated circuit (ASIC)) may be used in place of, or in combination with, software instructions for implementation of the processes of various embodiments. Thus, embodiments are not limited to any specific combination of hardware and software.

A "processor" means any one or more microprocessors, Central Processing Unit (CPU) devices, computing devices, microcontrollers, digital signal processors, or like devices. Exemplary processors are the INTEL PENTIUM or AMD ATHLON processors.

The term "computer-readable medium" refers to any statutory medium that participates in providing data (e.g., instructions) that may be read by a computer, a processor or a like device. Such a medium may take many forms, including but not limited to non-volatile media, volatile media, and specific statutory types of transmission media. Non-volatile media include, for example, optical or magnetic disks and other persistent memory. Volatile media include DRAM, which typically constitutes the main memory. Statutory types of transmission media include coaxial cables, copper wire and fiber optics, including the wires that comprise a system bus coupled to the processor. Common forms of computer-readable media include, for example, a floppy disk, a flexible disk, hard disk, magnetic tape, any other magnetic medium, a CD-ROM, Digital Video Disc (DVD), any other optical medium, punch cards, paper tape, any other physical medium with patterns of holes, a RAM, a PROM, an EPROM, a FLASH-EEPROM, a USB memory stick, a dongle, any other memory chip or cartridge, a carrier wave, or any other medium from which a computer can read. The terms "computer-readable memory", "article of manufacture" and/or "tangible media" specifically exclude signals, waves, and wave forms or other intangible or non-transitory media that may nevertheless be readable by a computer.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols. For a more exhaustive list of protocols, the term "network" is defined below and includes many exemplary protocols that are also applicable here.

It will be readily apparent that the various methods and algorithms described herein may be implemented by a control system and/or the instructions of the software may be designed to carry out the processes of the present invention.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models, hierarchical electronic file structures, and/or distributed databases) could be used to store and manipulate the data types described herein. Likewise, object methods or behaviors of a database can be used to implement various processes, such as those described herein. In addition, the databases may, in a known manner, be stored locally or remotely from a device that accesses data in such a database. Furthermore, while unified databases may be contemplated, it is also possible that the databases may be distributed and/or duplicated amongst a variety of devices.

As used herein a "network" is an environment wherein one or more computing devices may communicate with one another. Such devices may communicate directly or indirectly, via a wired or wireless medium such as the Internet, LAN, WAN or Ethernet (or IEEE 802.3), Token Ring, or via any appropriate communications means or combination of communications means. Exemplary protocols include but are not limited to: Bluetooth™, Time Division Multiple Access (TDMA), Code Division Multiple Access (CDMA), Global System for Mobile communications (GSM), Enhanced Data rates for GSM Evolution (EDGE), General Packet Radio Service (GPRS), Wideband CDMA (WCDMA), Advanced Mobile Phone System (AMPS), Digital AMPS (D-AMPS), IEEE 802.11 (WI-FI), IEEE 802.3, SAP, the best of breed (BOB), system to system (S2S), or the like. Note that if video signals or large files are being sent over the network, a broadband network may be used to alleviate delays associated with the transfer of such large files, however, such is not strictly required. Each of the devices is adapted to communicate on such a communication means. Any number and type of machines may be in communication via the network. Where the network is the Internet, communications over the Internet may be through a website maintained by a computer on a remote server or over an online data network including commercial online service providers, bulletin board systems, and the like. In yet other embodiments, the devices may communicate with one another over RF, cable TV, satellite links, and the like. Where appropriate encryption or other security measures such as logins and passwords may be provided to protect proprietary or confidential information.

Communication among computers and devices may be encrypted to insure privacy and prevent fraud in any of a variety of ways well known in the art. Appropriate cryptographic protocols for bolstering system security are described in Schneier, APPLIED CRYPTOGRAPHY, PROTOCOLS, ALGORITHMS, AND SOURCE CODE IN C, John Wiley & Sons, Inc. 2d ed., 1996, which is incorporated by reference in its entirety.

The term “whereby” is used herein only to precede a clause or other set of words that express only the intended result, objective or consequence of something that is previously and explicitly recited. Thus, when the term “whereby” is used in a claim, the clause or other words that the term “whereby” modifies do not establish specific further limitations of the claim or otherwise restricts the meaning or scope of the claim.

It will be readily apparent that the various methods and algorithms described herein may be implemented by, e.g., appropriately programmed general purpose computers and computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software. Accordingly, a description of a process likewise describes at least one apparatus for performing the process, and likewise describes at least one computer-readable medium and/or memory for performing the process. The apparatus that performs the process can include components and devices (e.g., a processor, input and output devices) appropriate to perform the process. A computer-readable medium can store program elements appropriate to perform the method.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants intend to file additional applications to pursue patents for subject matter that has been disclosed and enabled but not claimed in the present application.

What is claimed is:

1. A method for facilitating an online wagering game, the method being performed by a processor utilizing instructions of a game engine software module, the method comprising:

(a) determining that a special symbol which functions to trigger a block of symbols to be placed into a symbol matrix is part of an initial outcome for a game event, wherein the block of symbols comprises at least one symbol that (i) occupies a plurality of symbol positions within the symbol matrix when an entirety of it is positioned within the symbol matrix and (ii) is manipulated as a single unit;

(b) placing the block of symbols into the symbol matrix along with regular symbols;

(c) determining, after the block of symbols has been placed into the symbol matrix, that at least one winning combination of symbols has been created along at least one payline of the symbol matrix as a result of the block of symbols being placed into the symbol matrix;

(d) removing from the symbol matrix all regular symbols which are part of the at least one winning combination of symbols while maintaining the block of symbols intact even if the block of symbols was part of the at least one winning combination of symbols;

(e) removing, as a distinct step from (d) and irrespective of whether the block of symbols was part of the at least one winning combination of symbols, a portion of the block of symbols from the symbol matrix, the portion corresponding to one symbol position occupied by the block of symbols, thereby stepping the block of symbols out of the symbol matrix by one symbol position;

(f) placing replacement symbols into each symbol position which has been vacated as a result of (d) and (e);

(g) determining that at least one winning combination of symbols has been created along at least one payline of the symbol matrix as a result of the placement of the replacement symbols; and (h) repeating (d), (e) and (f) until an end condition occurs.

2. The method of claim 1, wherein at least one of the special symbol and the block of symbols is a wild symbol.

3. The method of claim 1, wherein the block of symbols comprises a single symbol which spans a plurality of symbol positions along at least one of a single row and a single column of the symbol matrix.

4. The method of claim 1, wherein (e) comprises removing the bottom-most portion of the block of symbols from the symbol matrix by moving the block of symbols in a downward motion out of the symbol matrix.

5. The method of claim 1, wherein (f) comprises moving symbols from symbol positions above the vacated symbol positions down into the vacated symbol positions.

6. The method of claim 1, wherein the end condition comprises (i) no additional winning combinations of symbols being created as a result of an immediately preceding cascade of symbols; and (ii) a placement of and additional block of symbols not being triggered as a result of the immediately preceding cascade of symbols.

7. The method of claim 1, wherein the method further comprises:

determining, via a first algorithm, that a block of symbols should be included in an outcome of the game; and determining, via a second algorithm which is distinct from the first algorithm, regular symbols to place into the symbol matrix for the outcome in addition to the block of symbols.

8. The method of claim 7, wherein the first algorithm also includes a determination of the plurality of symbol positions into which the block of symbols is to be placed for the outcome.

9. The method of claim 1, wherein the method further comprises moving the block of symbols into the symbol matrix over a course of a plurality of game events of the game.

10. The method of claim 1, wherein the game is a reel-based slot machine type of game and wherein the symbol matrix comprises symbol positions on reels of the game.

* * * * *